(12) United States Patent
Wiegand

(10) Patent No.: US 8,249,112 B2
(45) Date of Patent: Aug. 21, 2012

(54) APPARATUS AND METHOD FOR CODING AN INFORMATION SIGNAL INTO A DATA STREAM, CONVERTING THE DATA STREAM AND DECODING THE DATA STREAM

(75) Inventor: Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 55 days.

(21) Appl. No.: 12/725,323

(22) Filed: Mar. 16, 2010

(65) Prior Publication Data

US 2010/0172408 A1    Jul. 8, 2010

Related U.S. Application Data

(62) Division of application No. 12/422,169, filed on Apr. 10, 2009, now Pat. No. 8,139,611.

(51) Int. Cl.
*H04J 3/18* (2006.01)
*H04N 7/12* (2006.01)

(52) U.S. Cl. .................... 370/477; 375/240.26

(58) Field of Classification Search .............. 370/395.64
See application file for complete search history.

(56) References Cited

U.S. PATENT DOCUMENTS

| | | |
|---|---|---|
| 5,091,782 A | 2/1992 | Krause et al. |
| 5,140,417 A | 8/1992 | Tanaka et al. |
| 5,227,878 A | 7/1993 | Puri et al. |
| 5,272,478 A | 12/1993 | Allen |
| 5,347,308 A | 9/1994 | Wai |
| 5,363,099 A | 11/1994 | Allen |
| 5,396,497 A | 3/1995 | Veltman |
| 5,434,622 A | 7/1995 | Lim |
| 5,471,207 A | 11/1995 | Zandi et al. |
| 5,500,678 A | 3/1996 | Puri |
| 5,504,530 A | 4/1996 | Obikane et al. |
| 5,627,590 A * | 5/1997 | Hamano et al. .......... 375/240.13 |
| 5,659,631 A | 8/1997 | Gormish et al. |

(Continued)

OTHER PUBLICATIONS

Walker et al., "Generic Adaptation Layer for JVT Video", May 2002, Joint Video Team (AVC) of ISO/IEC MPEG & ITU-T VCEG (ISO/IEC JTC1/SC29/WG11 and ITU-T SG16 Q.6).*

(Continued)

*Primary Examiner* — Timothy J Weidner
(74) *Attorney, Agent, or Firm* — Michael A. Glenn; Glenn Patent Group

(57) ABSTRACT

More customization and adaptation of coded data streams may be achieved by processing the information signal such that the various syntax structures obtained by pre-coding the information signal are placed into logical data packets, each of which being associated with a specific data packet type of a predetermined set of data packet types, and by defining a predetermined order of data packet types within one access unit of data packets. The consecutive access units in the data stream may, for example, correspond to different time portions of the information signal. By defining the predetermined order among the data packet types it is possible, at decoder's side, to detect the borders between successive access units even when removable data packets are removed from the data stream on the way from the data stream source to the decoder without incorporation of any hints into the reminder of the data stream. Due to this, decoders surely detect the beginnings and endings of access units and therefore are not liable to a buffer overflow despite a removal of data packets from the data stream before arrival at the decoder.

2 Claims, 7 Drawing Sheets

U.S. PATENT DOCUMENTS

| | | | |
|---|---|---|---|
| 5,684,539 | A | 11/1997 | Boyce et al. |
| 5,767,909 | A | 6/1998 | Jung |
| 5,818,369 | A | 10/1998 | Withers |
| 5,949,912 | A | 9/1999 | Wu |
| 5,992,753 | A | 11/1999 | Xu |
| 6,075,471 | A | 6/2000 | Kimura et al. |
| 6,222,468 | B1 | 4/2001 | Allen |
| 6,263,115 | B1 | 7/2001 | Cho |
| 6,265,997 | B1 | 7/2001 | Nomizu |
| 6,275,533 | B1 | 8/2001 | Nishi |
| 6,298,160 | B1 | 10/2001 | Goertzen |
| 6,411,231 | B1 | 6/2002 | Yanagiya et al. |
| 6,522,651 | B2 | 2/2003 | Herrmann |
| 6,532,309 | B1 | 3/2003 | Sato et al. |
| 6,574,226 | B1 | 6/2003 | Nakano et al. |
| 6,574,243 | B2 | 6/2003 | Tsunoda et al. |
| 6,603,815 | B2 | 8/2003 | Suzuki et al. |
| 6,646,578 | B1* | 11/2003 | Au .................. 341/67 |
| 6,674,477 | B1 | 1/2004 | Yamaguchi et al. |
| 6,677,868 | B2 | 1/2004 | Kerofsky et al. |
| 6,771,197 | B1 | 8/2004 | Yedidia et al. |
| 6,795,584 | B2 | 9/2004 | Karczewicz et al. |
| 6,812,873 | B1 | 11/2004 | Siohan et al. |
| 6,927,710 | B2 | 8/2005 | Linzer et al. |
| 6,980,596 | B2 | 12/2005 | Wang et al. |
| 6,987,888 | B2 | 1/2006 | Wang et al. |
| 7,177,475 | B2 | 2/2007 | Wang et al. |
| 7,254,175 | B2 | 8/2007 | Hurst et al. |
| 7,586,924 | B2* | 9/2009 | Wiegand ............. 370/395.64 |
| 2002/0176025 | A1* | 11/2002 | Kim et al. ............ 348/699 |
| 2002/0176505 | A1* | 11/2002 | Kim et al. ............ 375/240.16 |
| 2003/0081850 | A1 | 5/2003 | Karczewicz et al. |
| 2003/0099292 | A1 | 5/2003 | Wang et al. |
| 2004/0101059 | A1* | 5/2004 | Joch et al. ............ 375/240.29 |
| 2004/0136352 | A1* | 7/2004 | Fu et al. ............... 370/341 |
| 2004/0136461 | A1 | 7/2004 | Kondo et al. |
| 2004/0146109 | A1 | 7/2004 | Kondo et al. |
| 2004/0268329 | A1 | 12/2004 | Prakasam |
| 2005/0012648 | A1* | 1/2005 | Marpe et al. .......... 341/107 |
| 2005/0038837 | A1* | 2/2005 | Marpe et al. .......... 708/200 |
| 2005/0053296 | A1 | 3/2005 | Srinivasan et al. |
| 2005/0074176 | A1* | 4/2005 | Marpe et al. .......... 382/239 |
| 2005/0117646 | A1* | 6/2005 | Joch et al. ............ 375/240.16 |
| 2005/0123055 | A1* | 6/2005 | Winger ............... 375/240.25 |
| 2005/0123207 | A1* | 6/2005 | Marpe et al. .......... 382/239 |
| 2005/0169374 | A1 | 8/2005 | Marpe et al. |
| 2005/0253740 | A1* | 11/2005 | Marpe et al. .......... 341/50 |
| 2006/0104349 | A1* | 5/2006 | Joch et al. ............ 375/240.03 |
| 2006/0227869 | A1* | 10/2006 | Joch et al. ............ 375/240.03 |
| 2006/0250653 | A1* | 11/2006 | Joch et al. ............ 358/3.26 |
| 2007/0201564 | A1* | 8/2007 | Joch et al. ............ 375/240.29 |
| 2008/0151997 | A1 | 6/2008 | Oguz |
| 2008/0310500 | A1* | 12/2008 | Winger ............... 375/240.01 |
| 2009/0034621 | A1* | 2/2009 | Joch et al. ............ 375/240.16 |
| 2009/0074057 | A1* | 3/2009 | Marpe et al. .......... 375/240.02 |
| 2009/0080521 | A1* | 3/2009 | Marpe et al. .......... 375/240.12 |
| 2009/0080532 | A1* | 3/2009 | Marpe et al. .......... 375/240.24 |
| 2009/0135908 | A1* | 5/2009 | Marpe et al. .......... 375/240.12 |
| 2009/0135915 | A1* | 5/2009 | Marpe et al. .......... 375/240.18 |
| 2009/0141803 | A1* | 6/2009 | Marpe et al. .......... 375/240.16 |
| 2009/0141806 | A1* | 6/2009 | Marpe et al. .......... 375/240.24 |
| 2009/0285309 | A1* | 11/2009 | Wiegand ............. 375/240.25 |
| 2010/0040138 | A1* | 2/2010 | Marpe et al. .......... 375/240.02 |
| 2010/0040139 | A1* | 2/2010 | Marpe et al. .......... 375/240.02 |
| 2010/0040140 | A1* | 2/2010 | Marpe et al. .......... 375/240.02 |
| 2010/0040148 | A1* | 2/2010 | Marpe et al. .......... 375/240.16 |
| 2010/0158102 | A1* | 6/2010 | Wiegand ............. 375/240.01 |
| 2010/0172408 | A1* | 7/2010 | Wiegand ............. 375/240.01 |
| 2010/0208735 | A1* | 8/2010 | Wiegand ............. 370/394 |
| 2010/0208754 | A1* | 8/2010 | Wiegand ............. 370/476 |
| 2010/0208791 | A1* | 8/2010 | Wiegand ............. 375/240.01 |
| 2010/0208792 | A1* | 8/2010 | Wiegand ............. 375/240.01 |
| 2010/0208808 | A1* | 8/2010 | Wiegand ............. 375/240.12 |

OTHER PUBLICATIONS

"Sample Data Coding"; Chapter 12, pp. 473-484, May 2001.

"Video Codec for Audiovisual Services at p x 64 kbit/s"; International Telecommunication Union; H.261 (Mar. 1993).

Puri et al., "Adaptive frame/field motion compensated video coding,"Signal Processing Image Communication, vol. 5, No. 1/02, Feb. 1, 1993, pp. 39-58.

Bossen, Frank, "CABAC cleanup and complexity reduction"; Joint Video Team of ISO/IEC MPEG & ITU-T VCEG; Document JVT-Exxx; 5th Meeting: Geneva, Switzerland, Oct. 2002.

Choi, Seung-Jong, and John W. Woods; "Motion-Compensated 3-D Subband Coding of Video"; IEEE Transactions on Image Processing, vol. 8, No. Feb. 1999.

Flierl, Markus and Bernd Girod; "Generalized B Pictures and the Draft H.264/AVC Codec"; IEEE Transactions on Circuits and Systems for VideoTechnology; vol. 13, No. 7, Jul. 2003.

Flierl, Markus, et al; "A locally design algorithm block-based multi-hypothesis motion-compensated prediction"; Proceedings of the IEEE DCC, pp. 239-248, Snowbird, Utah; Mar. 1988.

Gallager, Robert G. And David C. Van Voorhis; "Optimal Source Codes for Geometrically Distributed Integer Alphabets"; IEEE Transactions on Information Technology; pp. 228-230, Mar. 1975.

Gonzales, C.A., et al; "DCT Coding for Motion Video Storage using Adaptive Arithmetic Coding"; Signal Processing: Image Communication 2 (1960); vol. 2, No. 2, pp. 145-154; Aug. 1990.

Heising, G., et al; "Wavelet-based very low Bitrate coding using image warping"; IEE Proc.+Vis. Image Signal Process, vol. 148, No. 2, Apr. 2001.

Howard, Paul G. and Jeffrey Scott Viter; "Practical implementations of arithmetic code"; Brown University, Department of Computer Science, Technical Report No. 92-18; Revised version, Apr. 1992, Formerly Tecnical Report No. CS-91-45.

International Organization for Standardization; Organization Normalization; "Information Technology—Coding of Audio Visual Objects—Part 2: Visual"; N4350, Jul. 2001.

ISO/IEC 13818-2: 1995 (E) Specification, Jul.

Karczewicz, Marta and Ragip Kurceren; "The SP—SI—Frames Design for H.264/AVC"; IEEE Transactions on Circuits and Systems for VideoTechnology; vol. 13, No. 7, Jul. 2003.

Karczewicz, Mata, et al.; "Analysis and Simplification of Intra Prediction"; Joint Video Team of ISO/IEC MPEG & ITU-T VCEG; Document JVT-D025; 4th Meeting: Klagenfurt, Austria, Jul. 22-26, 2002.

List, Peter, et al; "Adaptive Deblocking Filter"; IEEE Transactions on Circuits and Systems for VideoTechnology; vol. 13, No. 7, Jul. 2003.

Malvar, Henrique S. et al; "Low-complexity Transformed Quantization in H.264/AVC"; IEEE Transactions on Circuits and Systems for VideoTechnology; vol. 13, No. 7, Jul. 2003.

Marpe, Detlev and Hans L. Cycon; "Efficient Pre-Coding Techniques for Wavelet-Based Image Compression"; Proc. Int. Picture Coding Symposium, pp. 45-50, 1997.

Marpe, Detlev and Hans L. Cycon; "Very Low Bit—Rate Video Coding Using Wavelet—Based Techniques"; IEEE Transactions on Circuits and Systems for Video Technology; vol. 9, No. 1, Feb. 1999.

Marpe, Detlev et al; "Context/Based Adaptive Binary Arithmetic Coding in the H.264/AVC Video Compression Standard"; IEEE Transactions on Circuits and Systems for VideoTechnology; vol. 13, No. 7, Jul. 2003.

Marpe, Detlev et al; "Proposed Editorial Changes and Cleanup of CABAC"; Joint Video Team of ISO/IEC MPEG & ITU-T VCEG: Document JVT-D019; 4th Meeting: Klagenfurt, Austria, Jul. 22-26, 2002.

Marpe, Detlev, et al.; "Proposed Cleanup changes for CABAC"; Joint Video Team of ISO/IEC MPEG & ITU-T VCEG; Document JVT-E059; 5th Meeting: Geneva, CH, Oct. 9-17, 2002.

Marpe, Detlev, et al; "Adaptive Codes for H.26L"; ITU-T Telecommunications Stardardization Sector; Video Coding Experts Group Document; Document VCEG-L13; Twelfth Meeting: Eibsee, Germany, Jan. 9-12, 2001.

Marpe, Detlev, et al; "Fast Arithmetic Coding for CABAC"; Joint Video Team of ISO/IEC MPEG & ITU-T VCEG; Document JVT-0060; 3rd Meeting: Fairfax, Virginia, USA, May 6-10, May 2002.

Marpe, Detlev, et al; "Final CABAC cleanup"; Joint Video Team of ISO/IEC MPEG & ITU-T VCEG; Document JVT-F039; 6th Meeting: Awaji, Island, JP, Dec. 5-13, 2002.

Marpe, Detlev, et al; "Further Results for CABAC entropy coding scheme"; ITU-T Telecommunications Standardization Sector; Video Coding Experts Group Document; Document VCEG-M59; Thirteenth Meeting; Austin, Texas, USA Apr. 2-4, 2001.

Marpe, Detlev, et al; "New Results on Improved CABAC"; Joint Video Team of ISO/IEC MEG & IU-T VCEG, Document JVT-B101; 2nd Meeting: Geneva, CH, Jan. 29-Feb. 1, 2002.

Marpe, Detlev, et al; Improved CABAC ; ITU-T Telecommunications Standardization Sector; Video Coding Experts Group Document; Document VCEG-018r1; 15th Meeting: Pattava. Thailand, Dec. 4-6, 2001.

Moffat, Alistair, et al; "Arithmetic Coding Revisited"; ACM Transactions on Information Systems, vol. 16, No. 3, pp. 256-294, Jul. 1998.

Mrak, Marta, et al.; "A Context Modeling Algorithm and its Application in Video Compression"; Fraunhofer-Institute HHI, Berlin, Germany Apr. 1999.

Pennebaker, W.B., et al; "An overview of the basic principles of the Q-Coder adaptive binary arithmetic coder", IBM. J. Res. Develop, vol. 32, No. 6, Nov. 1988.

Ribas-Cobera, Jordi et al; "A Generalized Hypothetical Reference Decoder for H.264/AVC"; IEEE Transactions on Circuits and Systems for VideoTechnology; vol. 13, No. 7, Jul. 2003.

Rissanen, Jorma and Glen G. Landgon, Jr; "Universal Modeling and Coding"; IEEE Transactions on Information Theory; vol. It-27 No. 1, Jan. 1981.

Rissanen, Jorma and K. M. Mohiuddin; :A multiplication-free multialphabet arithmetic code; IEEE Transactions on Communications; vol. 37, No. 2, Feb. 1989.

Rissanen, Jorma; "Universal Coding, Information, Prediction, and Estimation"; IEEE Transactions on Information Theory; vol. It-30, No. 4, Jul. 1984.

Said, Amir and William A. Pearlman; "A new fast and efficient image codec based on set partitioning in hierarchical trees"; IEEE Int. Smyp on Circuits and Systems, Chigcago, IL May 1993.

Schwarz Heiko, et al; "Improved CABAC"; Joint Video Team of ISO/IEC MPEG & ITU-T VCEG; Document JVT-0060; 3rd Meeting: Fairfax, Virginia, USA, May 6-10, 2002.

Schwarz, Heiko et al.; "CABAC and Slices"; Joint Video Team of ISO/IEC MPEG & ITU-T VCEG; Document JVT-D020r1; 4th Meeting: Klagenfurt, Austria, Jul. 22-26, 2002.

Stockhammer, Thomas, et al; "H.264/AVCinWireless Environments"; IEEE Transactions on Circuits and Systems for VideoTechnology; vol. 13, No. 7, Jul. 2003.

Sullivan, Gary: "Draft Text of Recommendation H.263 Version 2 ("H.263+") for Decision"; Study Group 16—Contribution COM-999; Study Period 1997-2000.

Teuhola, Jukka; "A Compression Method of Clustered Bit-Vektors"; Information Processing Letters, vol. 7, No. 6, pp. 308-311, Oct. 1978. The Concept of a Random Variable, pp. 82-84. Apr. 1996.

Wedi, Thomas and Hans Georg Musmann; "Motion-and Aliasing-Compensated Prediction for Hybrid Video Coding"; IEEE Transactions on Circuits and Systems for VideoTechnology; vol. 13, No. 7, Jul. 2003.

Weinberger, Marcelo J., et al; "Applications of universal context modeling to lossless compression of grey-scale images"; IEEE Transactions on Imaging Processing; vol. 5, No. 4, Apr. 1996.

Wenger, Stephan; "H.264/AVC Over IP"; IEEE Transactions on Circuits and Systems for VideoTechnology; vol. 13, No. 7, Jul. 2003.

Wiegand, Thomas, et al; "Draft ITU-T; Recommendation and Final Draft International Standard of Joint Video Specification; ITU-T Rec. H.264; ISO/IEC 14496-10 AVC"; 8th Meeting: Geneva, Switzerland, May 23-27, 2003.

Wiegand, Thomas, et al; "Long Term Memory Motion-Compensated Prediction"; IEEE Transactions on Circuits and Systems of VideoTechnology; vol. 9, No. 1, Feb. 1999.

Wiegand, Thomas, et al; "Overview of the H.264/AVC Video Coding Standard"; IEEE Transaction on Circuit and Systems for Video Technology, vol. 13 No. 7, Jul. 2003.

Wiegand, Thomas, et al; "Rate-Constrained Coder Control and Comparison of Video Coding Standards"; IEEE Transactions on Circuits and Systems for VideoTechnology: vol. 13, No. 7, Jul. 2003.

Wiegand, Thomas; "Draft ITU-T Recommendation and Final Draft International Standard of Joint Video Specification (ITU-T Rec. H.264; ISO/IEC; 14496-10 AVC)"; Document: JVTG050; 7th Meeting: Pattaya, Thailand, Mar. 7-14, 2003.

Wiegand, Thomas; "Study of Final Committee Draft of Joint Video Specification (ITU-T Rec. H.264, ISO/IEC 14496-10 AVC0)"; Joint Video Team of ISO/IEC MPEG & ITU-T VCEG: Document JVT-F100d2; 6th Meeting: Awaji, Island, JP, Dec. 5-13, 2002.

* cited by examiner

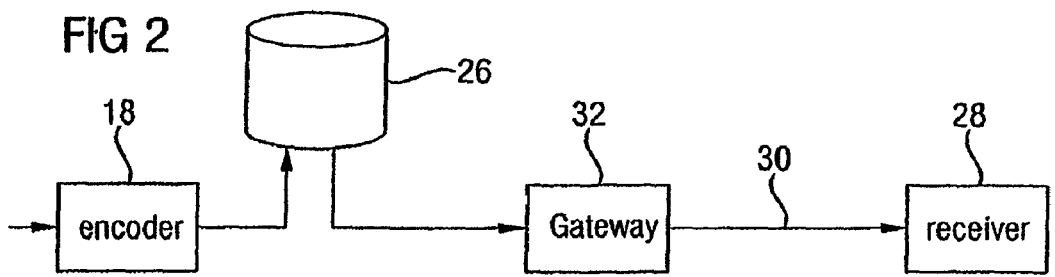
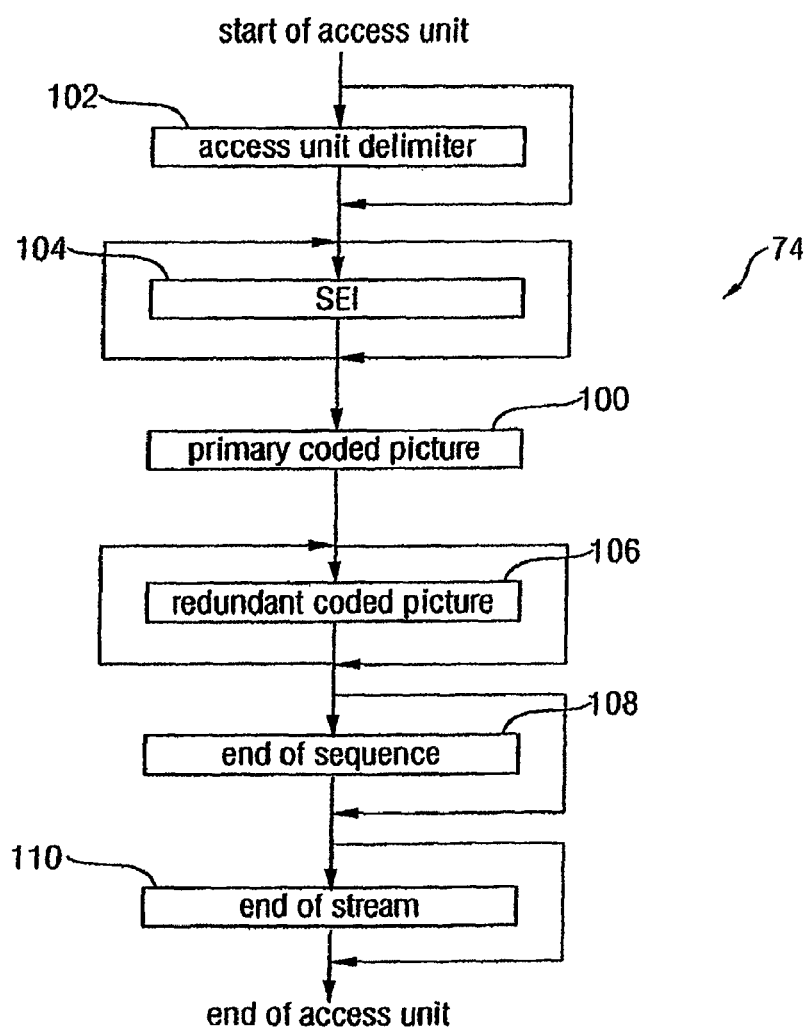

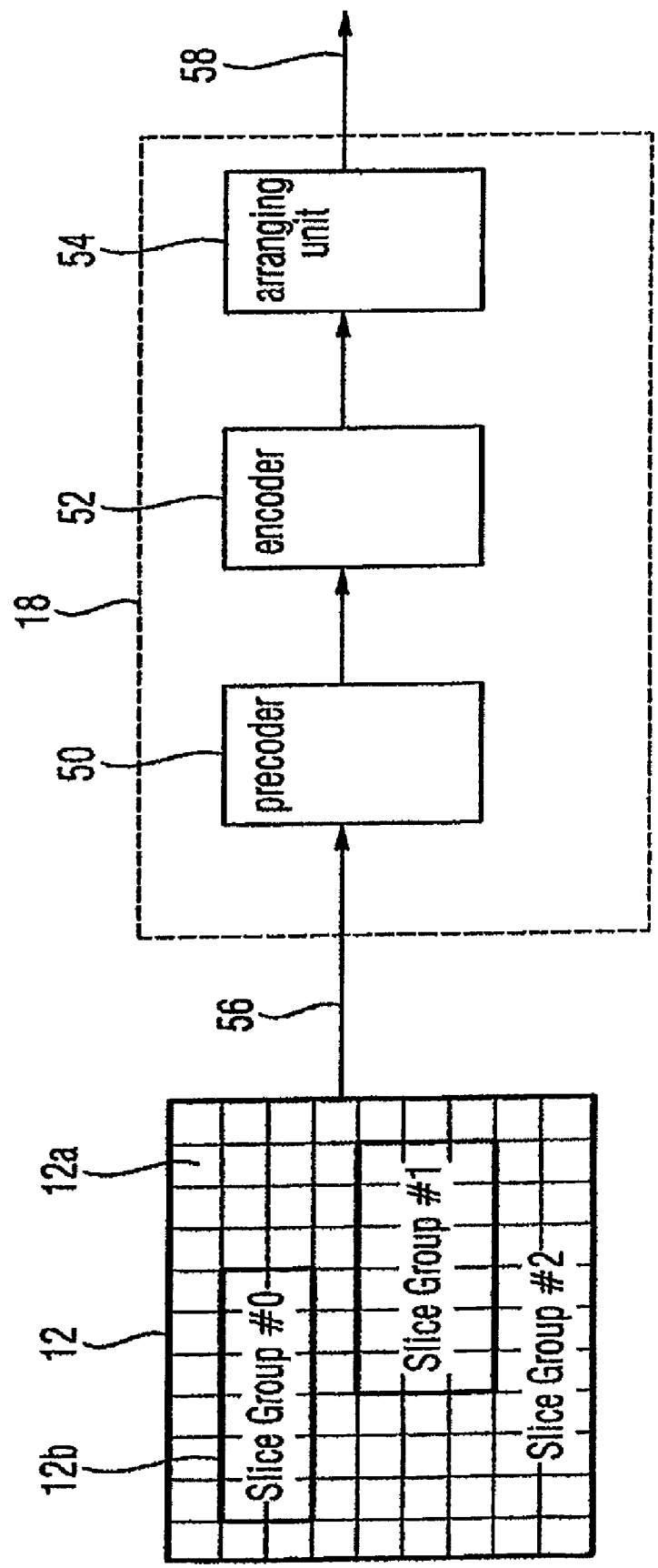

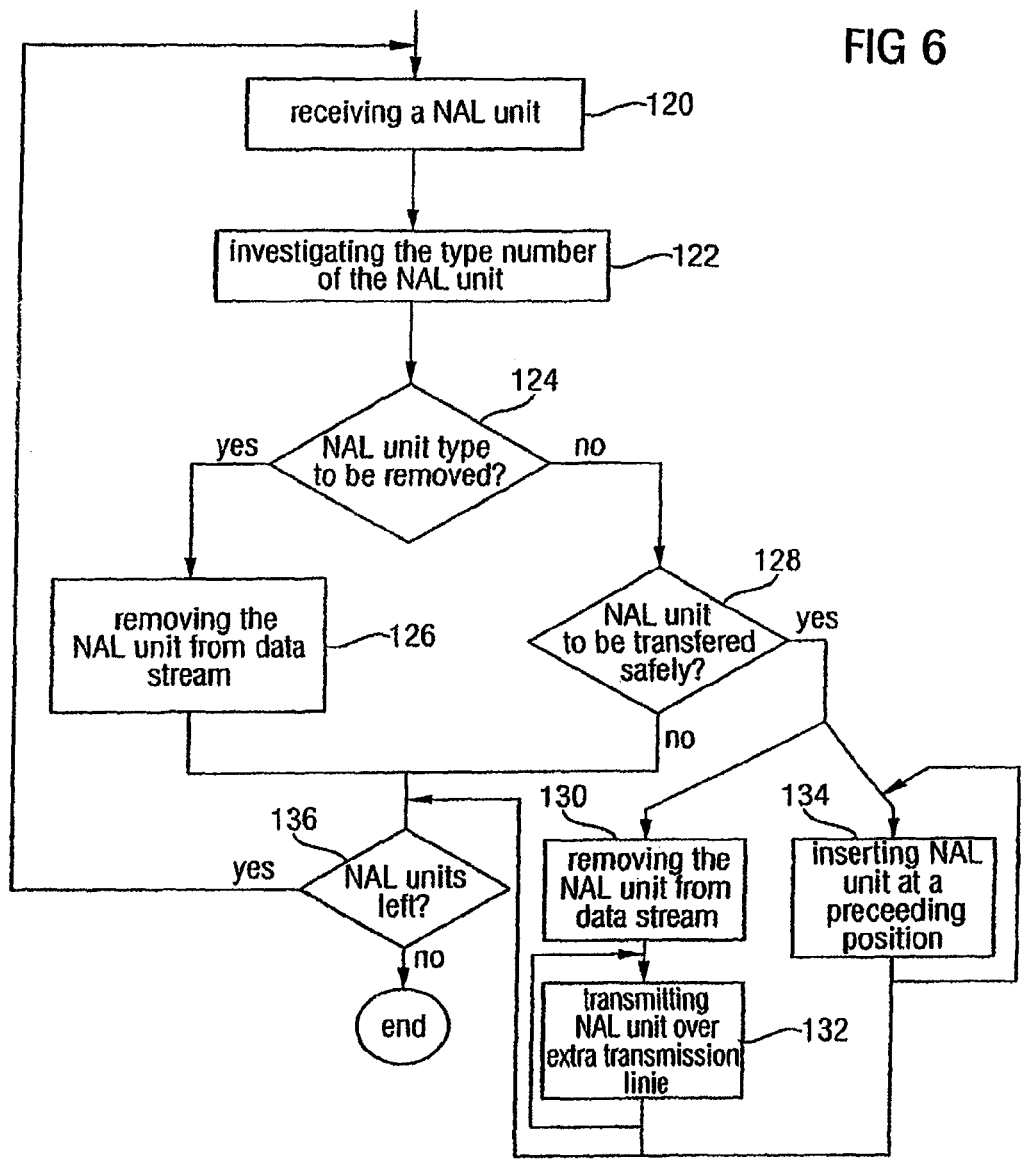

APPARATUS AND METHOD FOR CODING AN INFORMATION SIGNAL INTO A DATA STREAM, CONVERTING THE DATA STREAM AND DECODING THE DATA STREAM

CROSS REFERENCE TO RELATED APPLICATIONS

This application is a Divisional of U.S. patent application Ser. No. 12/422,169, entitled APPARATUS AND METHOD FOR CODING AN INFORMATION SIGNAL INTO A DATA STREAM, CONVERTING THE DATA STREAM AND DECODING THE DATA STREAM, filed Apr. 10, 2009 now U.S. Pat. No. 8,139,611 which claims priority to U.S. patent application Ser. No. 10/788,776, entitled APPARATUS AND METHOD FOR CODING AN INFORMATION SIGNAL INTO A DATA STREAM, CONVERTING THE DATA STREAM AND DECODING THE DATA STREAM, filed Feb. 27, 2004, now U.S. Pat. No. 7,586,924.

BACKGROUND OF THE INVENTION

1. Technical Field of the Invention

The present invention relates to information signal coding schemes in general and, in particular, to coding schemes suitable for single media or multimedia signal coding, such as video coding or audio coding.

2. Description of the Prior Art

The MPEG-2 video coding standard, which was developed about 10 years ago primarily as an extension of prior MPEG-1 video capability with support of interlaced video coding, was an enabling technology for digital television systems worldwide. It is widely used for the transmission of standard definition (SD) and High Definition (HD) TV signals over satellite, cable, and terrestrial emission and the storage of high-quality SD video signals onto DVDs.

However, an increasing number of services and growing popularity of high definition TV are creating greater needs for higher coding efficiency. Moreover, other transmission media such as Cable Modem, xDSL or UMTS offer much lower data rates than broadcast channels, and enhanced coding efficiency can enable the transmission of more video channels or higher quality video representations within existing digital transmission capacities.

Video coding for telecommunication applications has evolved through the development of the MPEG-2 coding standard, and has diversified from ISDN and T1/E1 service to embrace PSTN, mobile wireless networks, and LAN/Internet network delivery. Despite this evolution, there is still a need to maximize coding efficiency while dealing with the diversification of network types and their characteristic formatting and loss/error robustness requirements.

Recently, the MPEG-4 Visual standard has also begun to emerge in use in some application domains of the prior coding standards. It has provided video shape coding capability, and has similarly worked toward broadening the range of environments for digital video use.

However, the video schemes available today have in common, that it is difficult to adapt an already coded video stream during its way from its creation to the arrival at a receiver in order, for example, to adapt the performance level of the coded video stream to the performance of the receiver or to the performance of the transmission link connecting the coded video streams source and the receiver.

For example, a MPEG-4 data stream may be provided at a video server in Dolby surround, thus providing a relatively large number of audio channels. However, the receiver may be a device capable of only reproducing mono-audio information. In this case, transferring the video-coded stream with full performance level, i.e. incorporating all audio channels, would mean waste of transfer-linked capacity. Thus, it would be advantageous if a gateway between the coded video stream source and the receiver could convert the coded video stream from its initial performance level to a lower performance level. However, in available video coding schemes, the gateway may not convert a video data stream from a higher performance level to a lower performance level merely by discarding the portion of the coded video data stream pertaining the excessive channels without manipulating the reminder of the coded video stream, i.e. the portion concerning both the higher performance level as well as the lower performance level.

Therefore, there is a need for a video coding scheme, which allows a higher "network friendliness" to enable simple and effective customization for a broad variety of systems. To be more specific, the video coding scheme should allow a greater customization of carrying the video content in a manner appropriate for each specific network.

Moreover, the customization and adaptation of coded video streams should be possible with reasonable efforts.

SUMMARY OF THE INVENTION

It is the object of the present invention to provide an information signal coding scheme which enables more customization and adaptation of the coded data stream with reasonable efforts.

In accordance with a first aspect of the present invention, this object is achieved by an apparatus for coding an information signal, the apparatus comprising means for processing the information signal in order to obtain data packets, each data packet being of a data packet type of a predetermined set of data packet types, at least one of the data packet types being a removable data packet type; and means for arranging the data packets into a data stream so that the data stream comprises consecutive access units of consecutive data packets, so that the data packets within each access unit are arranged in accordance with a predetermined order among the data packet types, wherein the means for processing and the means for arranging are adapted so that even when a data packet of the removable data packet type is removed from the data stream, borders between successive access units are detectable from the data stream by use of the predetermined order.

In accordance with a second aspect of the present invention, this object is achieved by an apparatus for converting a data stream representing a coded version of an information signal from a first performance level to a second performance level, the data stream comprising consecutive access units of consecutive data packets, each data packet being of a data packet type of a predetermined set of data packet types, at least one of the data packet types being a removable data packet type, and the data packets within each access unit being arranged in accordance to a predetermined order among the data packet types such that even when a data packet of the removable data packet type is removed from the data stream, borders between successive access units are detectable from the data stream by use of the predetermined order, the apparatus comprising means for removing at least one data block of the removable data packet type from the bit stream without manipulating the reminder of the data stream.

In accordance with a third aspect of the present invention, this object is achieved by an apparatus for decoding a data stream representing a coded version of an information signal, the data stream comprising consecutive access units of consecutive data packets, each data packet being of a data packet type of a predetermined set of data packet types, at least one of the data packet types being a removable data packet type, and the data packet within each access unit being arranged in accordance with a predetermined order among the data packet types, such that even when a data packet of the removable data packet type is removed from the data stream, borders between successive access units are detectable from the data stream by use of the predetermined order, the apparatus comprising means for detecting a border between successive access units by use of the predetermined order; and means for decoding the successive access units.

In accordance with a forth aspect of the present invention, this object is achieved by a method for coding an information signal, the method comprising processing the information signal in order to obtain data packets, each data packet being of a data packet type of a predetermined set of data packet types, at least one of the data packet types being a removable data packet type; and arranging the data packets into a data stream so that the data stream comprises consecutive access units of consecutive data packets, so that the data packets within each access unit are arranged in accordance with a predetermined order among the data packet types, wherein the steps of processing and arranging are adapted so that even when a data packet of the removable data packet type is removed from the data stream, borders between successive access units are detectable from the data stream by use of the predetermined order.

In accordance with a fifth aspect of the present invention, this object is achieved by a method for converting a data stream representing a coded version of an information signal from a first performance level to a second performance level, the data stream comprising consecutive access units of consecutive data packets, each data packet being of a data packet type of a predetermined set of data packet types, at least one of the data packet types being a removable data packet type, and the data packets within each access unit being arranged in accordance to a predetermined order among the data packet types such that even when a data packet of the removable data packet type is removed from the data stream, borders between successive access units are detectable from the data stream by use of the predetermined order, the method comprising removing at least one data block of the removable data packet type from the bit stream without manipulating the reminder of the data stream.

In accordance with a sixth aspect of the present invention, this object is achieved by a method for decoding a data stream representing a coded version of an information signal, the data stream comprising consecutive access units of consecutive data packets, each data packet being of a data packet type of a predetermined set of data packet types, at least one of the data packet types being a removable data packet type, and the data packet within each access unit being arranged in accordance with a predetermined order among the data packet types, such that even when a data packet of the removable data packet type is removed from the data stream, borders between successive access units are detectable from the data stream by use of the predetermined order, the method comprising detecting a border between successive access units by use of the predetermined order; and decoding the successive access units.

In accordance with a sixth aspect of the present invention, this object is achieved by a data stream representing a coded version of a video or audio signal, the data stream comprising consecutive access units of consecutive data packets, each data packet being of a data packet type of a predetermined set of data packet types, at least one of the data packet types being a removable data packet type, and the data packets within each access unit being arranged in accordance with a predetermined order among the data packet types such that even when a data packet of the removable data packet type is removed from the data stream, borders between successive access units or detectable from the data stream by use of the predetermined order.

The present invention is based on the finding that a customization and adaptation of coded data streams may be achieved by processing the information signal such that the various syntax structures obtained by pre-coding the information signal are placed into logical data packets, each of which being associated with a specific data packet type of a predetermined set of data packet types, and by defining a predetermined order of data packet types within one access unit of data packets. The consecutive access units in the data stream may, for example, correspond to different time portions of the information signal. By defining the predetermined order among the data packet types it is possible, at decoder's side, to detect the borders between successive access units even when removable data packets are removed from the data stream on the way from the data stream source to the decoder without incorporation of any hints into the reminder of the data stream. Due to this, decoders surely detect the beginnings and endings of access units and therefore are not liable to a buffer overflow despite a removal of data packets from the data stream before arrival at the decoder.

The removable data packets may be data packets which are negligible or not necessary for decoding the values of the samples in the information signal. In this case, the removable data packets may contain redundant information concerning the video content. Alternatively, such removable data packets may contain supplemental enhancement information, such as timing information and other supplemental data that may enhance usability of the decoded information signal obtained from the data stream but are not necessary for decoding the values of the samples of the informations signal.

However, the removable data packets may also contain parameters sets, such as important header data, that can apply to a large number of other data packets. In this case, such removable data packets contain information necessary for retrieval of the video content from the data stream. Therefore, in case of removal of such data packets, same are transferred to the receiver in another way, for example, by use of a different transmission link or by inserting thus removed data packet somewhere else into the data stream in accordance with the predetermined order among the data packet types in order not to accidentally create a condition in the data stream defining the beginning of a new access unit although being in the middle of an access unit.

Thus, it is an advantage of the present invention that an information signal may be coded into a data stream composed of consecutive data packets, and that removable data packets may be removed from the data stream without having to manipulate the reminder of the data stream and with, despite this, the order among the data packet types within access units being maintained so that boarders between successive access units are still derivable by use of the order, preferably merely by the knowledge of the order.

Moreover, another advantage of the present invention is the higher flexibility in arranging the data packets in the data stream as long as the arrangement complies with the predetermined order among the data packet types. This allows duplicating data packets for redundancy enhancement and purposes as well as adapting the performance level of the data stream to the receiving or transmission environment.

SHORT DESCRIPTION OF THE DRAWINGS

Preferred embodiment of the present invention are described in more detail below with respect to the Figures.

FIG. 2 shows a block diagram of a system in which the procedures of FIG. 1 may be realized in accordance with an embodiment of the present invention.

FIG. 3 shows a block diagram of an encoder environment in accordance with an embodiment of the present invention.

FIG. 5 shows a syntax diagram for illustrating the structure of an access unit in accordance with the specific embodiment of FIG. 4.

FIG. 6 shows a flow diagram for illustrating a possible mode of operation in the gateway of FIG. 2 in accordance with an embodiment of the present invention.

DETAILED DESCRIPTION OF PREFERRED EMBODIMENTS OF THE PRESENT INVENTION

Before describing preferred embodiments of the present invention with respect to the figures, it is noted that like elements in the figures are designated by like reference numbers, and that a repeated explanation of these elements is left-out.

Figure 1:
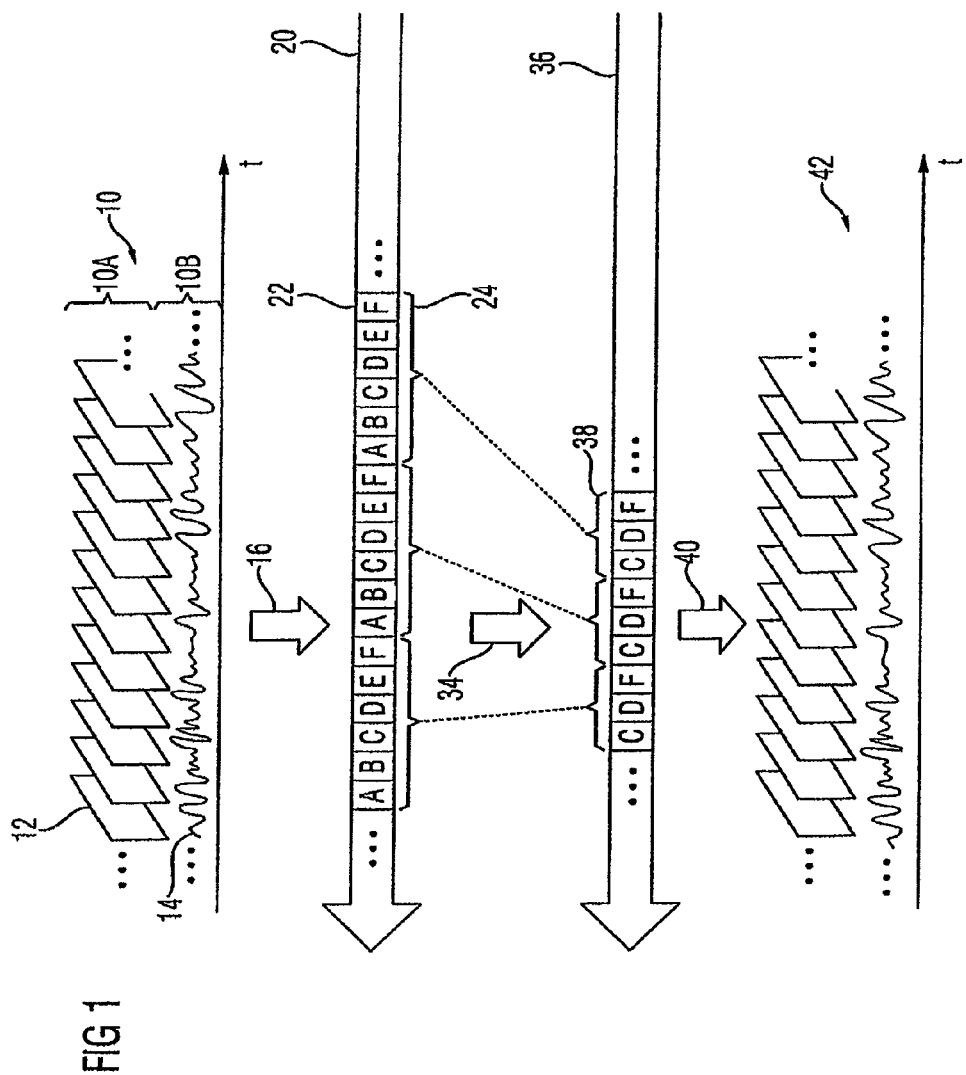
FIG. 1 shows a schematic diagram illustrating a creation, conversion and decoding of a data stream in accordance with an embodiment of the present invention.

FIG. 1 shows the creation, conversion and decoding of a data stream in accordance with an embodiment of the present invention, the data stream representing a coded version of an information signal, such as an audio, video or multimedia signal.

In FIG. 1, the information signal is indicated by reference number 10. Although the information signal 10 could be any time-domain or time-dependent information signal, the information 10 is illustrated as a multimedia signal comprised of a video signal or video content 10a and an audio signal or audio content 10b. The video content 10a is illustrated as being composed of a sequence of pictures 12, while the audio signal 10b is illustrated as comprising a sequence of audio samples 14, the sequence extending along the time axis t.

Although the information signal 10 could be handled, such as stored and transferred, in an un-coded digital manner, the information signal 10 is encoded in order to compress the information signal, i.e. to reduce the amount of data necessary in order to represent the information signal. This encoding process is indicated in FIG. 1 by arrow 16, while an encoder performing the encoding process 16 is indicated at 18 in FIG. 2 which is also referred to in the following and which shows an example for a possible environment in which the processes of FIG. 1 could be employed. By the encoding process 16 a bit stream 20 is obtained. The bit stream 20 is composed of a sequence of consecutive data packets 22, with the data stream 20 being illustrated as an arrow. The direction of the arrow indicates which of the data packets 22 precedes which data packet 22 of the data stream 20. The data packets are indicated by individual rectangles inside the arrow 20 and are labeled by A-F. Each data packet is uniquely associated with one of a predetermined set of data packet types, each data packet type being illustrated by A-F. The data packets 22 are, for example, associated with a respective data packet type by a type number in a header of the data packets 22. Each data packet type would by uniquely associated with a different type number.

Several consecutive data packets 22 are grouped into an access unit, as illustrated by braces 24. In this way, the data stream 20 is composed of immediately consecutive access units 24 which are themselves composed of immediately consecutive data packets 22.

Although access units 24 could have any meaning, in the following it will be assumed that each access unit 24 belongs to a specific time portion of the information signal 10. In the case of a multimedia signal, as illustrated at 10, each access unit 24 could, for example, represent a coded version of a specific of the pictures 12 and the corresponding portion of the audio signal 14 of the information signal 10.

As will be described in more detail below with respect to FIG. 3, the encoding process 16 could be composed of several steps. For example, as a first step the encoding process 16 could involve a pre-coding step in which samples of the information signal are pre-coded in order to obtain syntax elements of various syntax element types, each syntax element either applying to a portion of one picture 12 or a portion of the audio signal 14, to a whole picture 12 or to a sequence of pictures 12. As a second step, the encoding process 16 could then involve a step of grouping syntax elements being of the like syntax element type and applying to the same pictures 12 to obtain the individual data packets 22. In a further, last step, these data packets 22 would then be arranged in a sequence in order to obtain the data stream 20 the characteristics if which will be described in more detail below.

In the following, the encoding process 16 is assumed to be optimized in order to achieve a high-performance level coded version of the information signal 10. In other words, the encoding process 16 is assumed to be adjustable in the sense that the encoding process creates, beside others, syntax elements and corresponding data packets 22 which are not essential or absolutely necessary for retrieval of the information signal from the resulting data stream 20. In particular, it is assumed that the encoder 18 creates a data stream 20 being composed of the data packets of all possible or envisaged data packet types A-F. Of course, due to the high-performance level of the data stream 20, same involves a greater amount of data than a data stream of a lower-performance level.

As shown in FIG. 2, it is assumed that the data stream 20 is firstly stored in a store 26 such as a video server or the like, with which the encoder 18 is connected. Now, in order to enable the transmission of the data stream 20 to a receiver 28 via a transmission link 30 in an efficient way, a gateway 32 is connected between the store 26 and the receiver 28, and preferably between the store 26 and the transmission link 30. This gateway 32 performs an adaptation or conversion of the data stream 20 from the high-performance level as it is provided in the server 26 to a lower performance level which is adapted to the capacity and performance of the transmission line 30 and receiver 28, respectively. For example, the transmission link 30 may be a transmission link with a very low error bit rate. In this case, the gateway 32 would convert the data stream 20 into a data stream having less or no redundancy information.

In order to enable this conversion which is illustrated in FIG. 1 by an arrow 34, in an effective and very simple way, the encoding process 16 is performed such that the data packets 22 within one access unit 24 are arranged in accordance with a predetermined order among the data packet types A-F. For illustrating purposes only, it is assumed in FIG. 1 that the predetermined order among the data packet types A-F is equivalent to the alphabetical order. Thus, as can be seen from FIG. 1, in each access unit 24 the consecutive data packets 22 are arranged in alphabetical order with respect to their type. It is emphasized, that there is possibly more than one data packet of a specific data package type in an access unit, although such circumstances are not depicted in FIG. 1, and that the order among such data packets of the same data packet type may or may not be prescribed by a predetermined ordering rule. Moreover, even though it is assumed that the present data stream 20 is of highest performance level, there may exist access units 24 in the data stream 20 which do not contain data packets of all the data packet types A-F, although such an access unit is not shown in FIG. 1. Moreover, it is noted that for the purpose of enabling adaptation and converting the data stream in a simple way, a more relaxed predetermined order among the data packet types A-F could be sufficient as will be described in the following with respect to FIGS. 4 to 8. To be more precise, it is not necessary that the predetermined order is such strict that each data packet type is fixed to a position in front of all other data packet types, between two other data packet types or after all other data packet types. Rather, it could be sufficient if the predetermined order contains just one or more ordering rules such as "data packets of the removable data packet type X (X=A, . . . , F) have to precede or succeed data packets of data packet type Y (Y≠X and Y=A, . . . , F)". In particular, it would be possible that instead of the strict alphabetic order, the predetermined order could allow the mixing-up of data packets of the data packet types C and D, for example.

Due to the prescribed order among the data packet types A-F, the gateway 32 can convert the data stream 20 having a high-performance level to a data stream 36 having a lower performance level merely by removing some of the removable data packet types which, for example, contain redundant picture information or supplemental enhancement information which is not necessary for retrieval of the pictures 12 or audio signal 14 from the data stream 20. Moreover, the removed data packets of the removable data packet types could as well concern essential information. In this case, the gateway 32 would, for example, transmit this information of these data packets via a different transmission link to the receiver 28 as will be described in more detail below.

As can be seen in FIG. 1, it is assumed that in the conversion process 34 performed by gateway 32 all data packets 22 of the data packet types A, B, and E have been removed from the data stream 20 in order to obtain a shortened data stream 36. As can easily be understood, the borders between successive access units can still easily be detected in the data stream 36 by means of the predetermined order: Each time a data packet of a specific data packet type X precedes a data of a data packet type Y that, in accordance with the predetermined order, precedes the data packet type X of the preceding data packet, between these data packets two successive access units 38 abut or a border between two successive access 38 units exists. In the exemplary case of FIG. 1, this condition applies all times when the data packet of the data packet type F precedes a data packet of the data packet type C. Thus, the extension of each access unit 38 in the converted data stream 36 can still easily be obtained at decoder's side by use of the knowledge of the predetermined order among data packet types even though, at decoder's side, it is unknown which if the removable data packet types have been removed. Thus, each access unit of the access units in the converted data stream 36 which are indicated by braces 38 corresponds with one of the access units 24 in the data stream 20. In particular, the access units 24 and access units 38 are equal in number and order. Moreover, since the borders between successive access units are detectable even in the modified data stream 36 and are arranged at the same places, removal of data packets merely results reducing the size of access units 38 of data stream 36 relative to the access units 24 in data stream 22.

After transmission of the data stream 36 via a transmission link 30 to receiver 28, the converter data stream 36 is decoded at the receiver 28 in a decoding process 40. The receiver 28 may decode the data stream 36 solely by use of the data stream itself if the data packets removed at the converting process 34 merely contained information not being necessary for retrieval of the original information signal 10. In the other case, the receiver 28 decodes the converted data stream 36 based on information contained in the data packets having been removed in the converting process 34 and having been transmitted to receiver 28 via an extra transmission link, for example.

The result of the decoding process 40 is a decoded information signal 42 in a quality as it would be obtained by directly decoding the data stream 20. Alternatively, the quality of the decoded information signal 42 is somewhat reduced in comparison to the quality of a decoded information signal as obtained directly by decoding data stream 20.

To summarize, by defining the predetermined order among the data packet types, it is possible not only to maintain the correspondence between access units in the original data stream 20 and the access units 38 in the converted data stream 36 but also to enable the receiver 28 to associate each data packet with the access unit it originally belonged to in the original data stream 20. The latter guaranties that a receiver 28 buffering the incoming data packets and emptying the buffer in units of access units is not liable to a buffer overflow as will be described in more detail below.

In the following, a specific embodiment of the present invention will be described in view of a video signal as the information signal. In the following, reference will also be made to FIG. 2, in order to illustrate the following specific embodiment in view of an exemplary application environment.

FIG. 3 shows an embodiment of an encoder 18 for encoding a video signal into a data stream. The encoder 18 comprises a precoder 50, an encoder 52 and an arranging unit 54 all being connected in series between an input 56 and an output 58 of the encoder 18. At the input 56 the encoder 18 receives the video signal, wherein in FIG. 3 illustratively one picture 12 of the video signal is shown. All pictures 12 of the video signal are composed of a plurality of pixels or picture samples arranged in rows and columns.

The video signal or pictures 12 are fed via input 56 to the video precoder 50. The video precoder 50 treats the pictures 12 in units of so-called macroblocks 12a, i.e. a block of, for example, 4×4 pixel samples. On each macroblock 12a precoder 50 performs a transformation into spectral transformation coefficients followed by a quantization into transform coefficient levels. Moreover, intra-frame prediction or motion-compensation is used in order not to perform the afore-mentioned steps directly on the pixel data but on the differences of same to predicted pixel values, thereby achieving small values which may more easily be compressed.

The macroblocks into which the picture 12 is partitioned are grouped into several slices. For each slice a number of syntax elements are generated which form a coded version of the macroblocks of the slice. For illustration purposes, in FIG. 3 the picture 12 is shown as being partitioned into three slice groups or slices 12b.

The syntax elements output by precoder 50 are dividable into several categories or types. The encoder 52 collects the syntax elements of the same category and belonging to the same slice of the same picture 12 of a sequence of pictures and groups them to obtain data packets. In particular, in order to obtain a data packet, the encoder 52 forms a compressed representation of the syntax elements belonging to a specific data packet to obtain payload data. To this payload data encoder 52 attaches a type number indicating the data packet type to obtain a data packet. The precoder 50 and the encoder 52 of the encoder 18 form a so-called video coding layer (VCL) for efficiently representing the video content.

Figure 4:
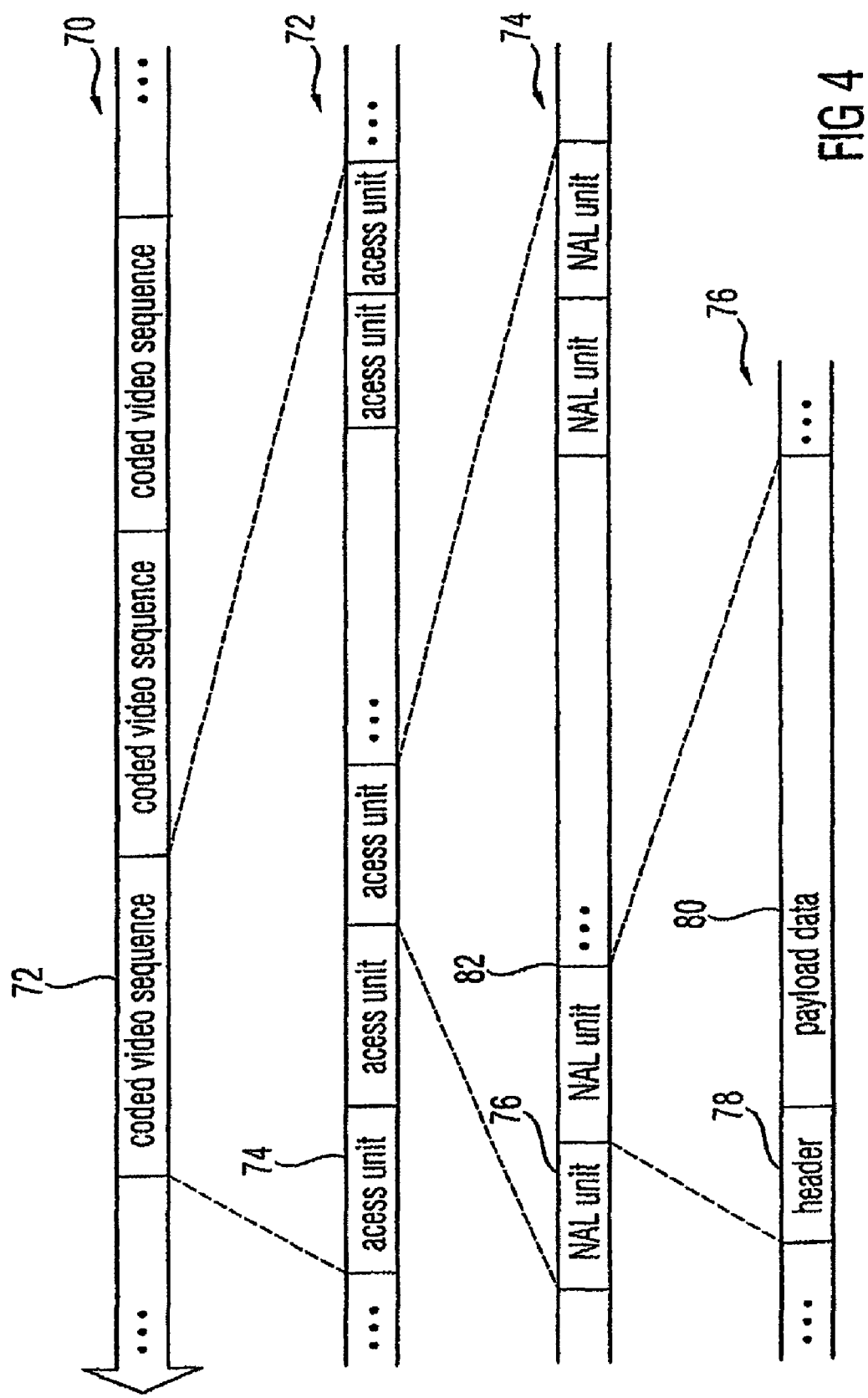
FIG. 4 shows a schematic diagram illustrating the structure of a data stream in accordance with a specific embodiment of the present invention.

The data packets output by encoder 52 are arranged into a data stream by arranging unit 55 as will be described in more detail with respect to FIG. 4. The arranging unit 55 represents the network abstraction layer (NAL) of encoder 18 for formatting the VCL representation of the video and providing header information in a manner appropriate for conveyance by a variety of transport layers of a storage media.

The structure of the data stream output by encoder 18 of FIG. 3 is described in more detail below with respect to FIG. 4. In FIG. 4, the data stream output at output 58 is shown at 70. The data stream 70 is organized in consecutive blocks 72 of coded video sequences of consecutive pictures of a video. The coded video sequence blocks 72 internally consist of a series of access units 74 that are sequential in the data stream 70. Each coded video sequence 72 can be decoded independently of any other coded video sequence 72 from the data stream 70, given the necessary parameter set information, which may be conveyed "in-band" or "out-of-band" as will be described in more detail below. Each coded video sequence 72 uses only one sequence parameter set.

At the beginning of a coded video sequence 72 is an access unit 74 of a special type, called instantaneous decoding refresh (IDR) access unit. An IDR access unit contains an intra picture, i.e. a coded picture that can be decoded without decoding any previous pictures in the data stream 70. The presence of an IDR access unit in the data stream 70 indicates that no subsequent picture in the stream 70 will require reference to pictures prior to the intra picture it contains in order to be decoded. The data stream 70 may contain one or more coded video sequences 72.

An access unit 74 is a set of NAL units 76 in a specified form, the specified form being explained in more detail below. The decoding of each access unit 74 results in one decoded picture. In the following, the data stream 70 is also sometimes called NAL unit stream 70.

The NAL units 76 correspond with the data packets mentioned above with respect to FIG. 3. In other words, the coded video data is organized by encoder 52 in NAL units 76. Each NAL unit 76 is effectively a packet that contains an integer number of bytes. The first byte of each NAL unit is a header byte 78 that contains an indication of the type of data in the NAL unit, and the remaining bytes contain payload 80 data of the type indicated by header 78.

The payload data 80 in the NAL units 76 may be interleaved, as necessary, with emulation prevention bytes. Emulation prevention bytes are bytes inserted with a specific value to prevent a particular pattern of data called a start co-prefix from being accidentally generated inside the payload.

The NAL unit structure definition specifies a generic format for use in both packet-oriented and bit stream-oriented transport systems, at a series of NAL units generated by an encoder as referred to as the NAL unit stream 70.

For example, some systems require delivery of the entire or partial NAL unit stream 70 as an ordered stream of bytes or bits within which the locations of NAL unit boundaries 82 need to be identifiable from patterns with the coded data itself.

For use in such systems, encoder 18 creates data stream 70 in a byte stream format. In the byte stream format each NAL unit 76 is prefixed by a specific pattern of, for example, three bytes, called a start code prefix. This start code prefix is not shown in FIG. 4 since it is optionally. If present, the start code prefix within an NAL unit precedes the header byte 78. The boundaries of the NAL 76 can then be identified by searching the coded data for the unique start code prefix pattern. Moreover, the NAL data stream output by encoder 18 of FIG. 3 may be interleaved by emulation prevention bytes within the payload data blocks 80 of the NAL units 76 in order to guarantee that start code prefixes are unique identifiers of a start of a new NAL unit 76. A small amount of additional data (one byte per video picture) may also be added to allow decoders that operate in systems that provide streams of bits without alignment to byte boundaries to recover the necessary alignment from the data in the stream.

Additional data could also be inserted into the byte stream format that allows expansion of the amount of data to be sent and can aid in achieving more rapid byte alignment recovery, if desired.

In other systems, like internet protocol or RTP systems, the coded data or data stream 70 is carried in packets that are framed by the system transport protocol, an identification of the boundaries of NAL units within the packets can be established without use of start code prefix patterns. In such systems, the inclusion of start code prefixes in the data of NAL units 76 would be a waste of data-carrying capacity, so instead the NAL units 76 can be carried in data packets without start code prefixes.

NAL units are classified into VCL and non-VCL NAL units. The VCL NAL units contain the data that represents the values of the samples in the video pictures 12 and are, therefore, necessary for decoding, and the non-VCL NAL units contain any associated additional information such as parameter sets, i.e. important header data that can apply to a large number of VCL NAL units, and supplemental enhancement information, such as timing information and other supplemental data that may enhance usability of the decoded video signal (42 in FIG. 1) but are not necessary for decoding the values of the samples in the video pictures 12.

A parameter set is supposed to contain information that is expected to rarely change and offers the decoding of a large number of VCL NAL units. There are two types of parameter sets:

sequence parameter sets, which apply to a series of consecutive coded video pictures called a coded video sequence, and picture parameter sets, which apply to the decoding of one or more individual pictures 12 within a coded video sequence 72.

The sequence and picture parameter set mechanism which is described in more detail below decouples the transmission of infrequently changing information from the transmission of coded representations of the values of the samples in the video pictures 12. Each VCL NAL unit 76 contains in its payload data portion 80 an identifier that refers to the content of the relevant picture parameter set, and each picture parameter set non-VCL NAL unit contains in its payload data portion 80 an identifier that refers to the content of the relevant sequence parameter set. In this manner, a small amount of data, i.e. the identifier, can be used to refer to a larger amount of information, i.e. the parameter set, without repeating that information within each VCL NAL unit.

Sequence and picture parameter sets can be sent well ahead of the VCL NAL units that they apply to, and can be repeated to provide robustness against data loss, as will be described in more detail below. In some applications, parameter sets may be sent within the channel that carries the VCL NAL units termed "in-band" transmission. In other applications, it can be advantageous to convey the parameter sets "out-of-band" using a more reliable transport mechanism or transmission link than the video channel for transmitting the NAL data stream 70 itself as will be described in the following with respect to FIGS. 6 and 7.

Now, before explaining in detail the predetermined order among the NAL unit types in accordance with the present embodiment, in the following the different NAL unit types are listed in Table 1 below along with their associated NAL unit type number for reasons of completeness.

TABLE

NAL units

| Nal unit type | Content of NAL unit and RBSP syntax structure | C |
|---|---|---|
| 0 | Unspecified | |
| 1 | coded slice of a non-IDR picture slice_layer_without_partitioning_NAL unit( ) | 2, 3, 4 |
| 2 | Coded slice data partition A slice_data_partition_a_layer_NAL unit( ) | 2 |
| 3 | Coded slice data partition B slice_data_partition_b_layer-_NAL unit( ) | 3 |
| 4 | Coded slice data partition C slice_data_partition_c_layer_NAL unit( ) | 4 |
| 5 | Coded slice of an IDR picture slice_layer_without_partitioning_NAL unit( ) | 2, 3 |
| 6 | Supplemental enhancement information (SEI) sei_NAL unit( ) | 5 |
| 7 | Sequence parameter set seq_parameter_set_NAL unit( ) | 0 |
| 8 | Picture parameter set pic_parameter_set_NAL unit( ) | 1 |
| 9 | Access unit delimiter access_unit_delimiter_NAL unit( ) | 6 |
| 10 | End of sequence end_of_seq_NAL unit( ) | 7 |
| 11 | End of stream end_of_stream_NAL unit( ) | 8 |
| 12 | Filler data filler_data_NAL unit( ) | 9 |
| 13 ... 23 | Reserved | |
| 24 ... 31 | Unspecified | |

As can be seen from Table 1, NAL units 76 having a NAL unit type 1 as its header byte 78 belong to one of the non-IDR access units, i.e. one of the access units 74 which succeed the first access unit of each coded video sequence 72, which is the IDR access unit as mentioned before. Moreover, as indicated in Table 1, a NAL unit 76 of NAL unit type 1 represent coded versions of a slice of a non-IDR picture, i.e. a picture other than the first picture of a coded video sequence 72. As is shown in the last column of Table 1, in NAL units 76 of NAL unit type 1 syntax elements of categories C=2, 3 and 4 are combined.

At the side of the encoder, it may have been decided not to combine the syntax elements of category 2, 3 and 4 of one slice in one common NAL unit 76. In this case, partitioning is used in order to distribute the syntax elements of different categories 2, 3 and 4 to NAL units of different NAL unit types, i.e. NAL unit type 2, 3 and 4 for categories C 2, 3 and 4, respectively. To be more specific, partition A contains all syntax elements of category 2. Category 2 syntax elements include all syntax elements in the slice header and slice data syntax structures other than the syntax elements concerning single transform coefficients. Generally spoken, partition A syntax elements as contained in NAL units of the NAL unit type 2 are more important than the syntax elements contained in NAL units 76 of NAL unit type 3 and 4. These latter NAL units contain syntax elements of category 3 and 4, which include syntax elements concerning transform coefficients.

As can be seen, slice data partitioning is not possible within the first picture of a video sequence so that coded versions of slices of an IDR picture are conveyed by NAL units 76 of a NAL unit type 5.

NAL units 76 of NAL unit type 6 contain in its payload data portion 80 supplemental enhancement information (SEI) with the afore-mentioned examples.

NAL units 76 of NAL unit type 7 contain in its payload data 80 a sequence parameters set, while NAL units 76 of NAL unit type 8 contain in its payload data 80 a picture parameter set.

NAL units 76 of NAL unit type 9 are called an access unit delimiter and indicate the beginning of an access unit. As it will turn out from the following description, access unit delimiter are optional and not necessary for parsing of the NAL data stream 70.

NAL units of NAL unit types 10 and 11 are NAL units indicating the end of a sequence and the end of the whole data stream, respectively. NAL units 76 of NAL unit type 12 contain in its payload portion 80 filler data as may be necessary for some networks. NAL unit types 13 to 23 and 24 to 31 pertain reserved or unspecified NAL unit types for specific applications.

Now, after having described rather broadly the structure of the NAL unit stream 70 generated by the encoder 18 of FIG. 3, the constrains on the order of the NAL units 76 in the bit stream 70 are described in more detail with reference to Table 1 and FIG. 4. Any order of NAL units 76 and the data or bit stream 70 obeying the below mentioned constrains are, in accordance with the present embodiment of the present invention, in conformity with parsing rules used by a decoder of interest in order to retrieve the coded information, i.e. the video signal. Decoders using that parsing rules shall be capable of receiving NAL units in this parsing or decoding order and retrieving the syntax elements.

In the following, the positioning of sequence and picture parameter set NAL units, i.e. NAL units of NAL unit type 7 and 8, is specified first. Then, the order of access units 74 is specified. Then, the order of NAL unit 76 and coded pictures 12 and their association to access units 74 is specified. Finally, the order of VCL NAL units and association to coded pictures is described.

As mentioned before, NAL units 76 are classified into VCL and non-VCL NAL units. The VCL NAL units contain the data that represent the values of the samples and the video pictures, and the non-VCL NAL units contain any associated additional information such as parameter sets and supplemental enhancement information, such as timing information and other supplemental data that may enhance usability of the decoded video signal but are not necessary for decoding the values of the samples and the video pictures. With reference to Table 1, which specifies the type of RBSP data structure contained in the NAL unit 76, VCL NAL units are specified as those NAL units having NAL_unit_type=1, 2, 3, 4, 5 or 12, all remaining NAL units are called non-VCL NAL units.

The NAL units having NAL unit type other than 1-5 and NAL units having NAL unit type 1-5 and, concurrently, having a syntax element indicating that they are concerning redundant pictures are removable NAL units.

In the following, the payload data 80 is sometimes called Raw Bata Sequence Payload or RBSP. The RBSP 80 is a syntax structure containing an integer number of bytes that is encapsulated in a NAL unit 76. An RBSP is either empty or has the form of a string of data bytes containing syntax elements followed by an RBSP stop bit and followed by a zero and more subsequent bytes equal to zero.

In this way, a NAL unit 76 is a syntax structure containing an indication of the type of data to follow, i.e. the header byte 78, and bytes 80 containing the data in the form of an RBSP interspersed as necessary with emulation prevention bytes as already noted above.

On the other hand, an access unit 74 represents any primary coded picture, zero or more corresponding redundant coded pictures, and zero or more non-VCL NAL units. The association of VCL NAL units to primary or redundant coded pictures or access units is described below.

In order to allow the removal of removable NAL units 76 from data stream 70 with remaining the decoding or parsing order, the format of the access unit 74 is like shown in FIG. 5. The NAL units 76 that can be removed are all types except VCL NAL units of a primary coded picture, i.e. all NAL unit types except NAL unit types 1 to 5.

As shown in FIG. 5, each access unit contains in any case a set of VCL NAL units that together compose a primary coded picture 100. An access unit may be prefixed with an access unit delimiter 102, i.e. a NAL unit having NAL_unit_type 9 to 8 to aid in locating the start of the access unit 74. Some supplemental enhancement information SEI in form of SEI NAL units of NAL unit type 6 containing data such as picture timing information may also precede the primary coded picture 100, this SEI block being indicated by reference number 104.

The primary coded picture consists of a set of VCL NAL units 76 consisting of slices or sliced data partitions that represent samples of the video picture.

Following the primary coded picture 100 may be some additional VCL NAL units that contain redundant representations of areas of the same video picture. These are referred to as redundant coded pictures 106, and are available for use by a decoder in recovering from loss or correction of the data in the primary coded pictures 100. Decoders are not required to decode redundant coded pictures if they are present. Finally, if the coded picture the access unit 74 is associated with is the last picture of a coded video sequence 72, wherein a sequence of pictures is independently decodable and uses only one sequence parameter set, an end of sequence NAL unit 108 may be present to indicate the end of the sequence 72. And if the coded picture is the last coded picture in the entire NAL unit stream 70, an end of stream NAL unit 110 may be present to indicate that the stream 70 is ending.

FIG. 5 shows the structure of access units not containing any NAL units with NAL_unit_type=0, 7, 8 or in the range of 12 to 31, inclusive. The reason for having limited the illustration of access units to cases where NAL units of the aforementioned have been removed is, that, as already noted above, sequence and picture parameter sets in NAL units of NAL unit type 7 and 8 may, in some applications, be conveyed "out-of-band" using a reliable transport mechanism or, in an redundant manner, in-band. Thus, an encoder 18 may output the sequence and picture parameter sets in-band i.e. in the data stream 70, or out-of-band i.e. using an extra output terminal.

Anyway, the encoder 18 or any means in between the encoder 18 and the decoder 28 has to guarantee that the following constrains on the order of sequence and parameter set RBSPs and their activation are obeyed.

A picture parameter set RBSP includes parameters that can be referred to by decoded slice A NAL units or coded slice data partition NAL units of one or more coded pictures.

I) When a picture parameter set RBSP having a particular value of PIC_parameter_set_id, i.e. the header byte 78, is referred to by a coded slice NAL unit or coded slice data partition A NAL unit using that value of PIC_parameter_set_id, it is activated. This picture parameter set RBSP is called the active picture parameter set RBSP until it is deactivated by the activation of another picture parameter set RBSP. Picture parameter set RBSP, with that particular value of PIC_parameter_set_id, shall be available to the decoding process at decoder 28 prior to its activation. Thus, the encoder 18 has to take this into account when transmitting sequence and picture parameter set in-band or out-of-band.

Any picture parameter set NAL unit containing the value of pic_parameter_set_id for the active picture parameter set RBSP shall have the same content as that of the active picture parameter set RBSP unless it follows the last VCL NAL unit of a coded picture and precedes the first VCL NAL unit of another coded picture.

A sequence parameter set RBSP includes parameters that can be referred to by one or more picture parameter set RBSPs or one or more SEI NAL units containing a buffering period SEI message.

II) When a sequence parameter set RBSP (with a particular value of seq_parameter_set_id) is referred to by activation of a picture parameter set RESP (using that value of seq_parameter_set_id) or is referred to by an SEI NAL unit containing a buffering period SEI message (using that value of seq_parameter_set_id), it is activated. This sequence parameter set RBSP is called the active sequence parameter set RBSP until it is deactivated by the activation of another sequence parameter et RBSP. A sequence parameter set RESP, with that particular value of seq_parameter_set_id, shall be available to the decoding process prior to its activation. An activated sequence parameter set RBSP shall remain active for the entire coded video sequence.

Any sequence parameter set NAL unit containing the value of seq_parameter_set_id for the active sequence parameter set RBSP shall have the same content as that of the active sequence parameter set RESP unless it follows the last access unit of a coded video sequence and precedes the first VCL NAL unit and the first SEI NAL unit containing a buffering period SEI message (when present) of another coded video sequence.

In the following, the order of NAL units and coded pictures and their association to access units is described in more detail as before with reference to FIG. 5.

An access unit 74 consists of one primary coded picture 100, zero or more corresponding redundant coded pictures 106, and zero or more one-VCL NAL units 102, 104, 108 and 110, as already mentioned above.

The association of VCL NAL units to primary or redundant coded pictures is described below.

The first of any of the following NAL units 76 after the last VCL NAL unit of a primary coded picture 100 specifies the start of a new access unit.

a) Access unit delimiter NAL unit (NAL unit type 9) (when present)

b) sequence parameter set NAL unit (NAL unit type 7) (when present)

c) picture parameter set NAL unit (NAL unit type 8) (when present)
d) SEI NAL unit (NAL unit type 6) (when present)
e) NAL units with nal_unit_type in the range of 13 to 18, inclusive
f) first VCL NAL unit of a primary coded picture (NAL unit type 1-5) (always present)

The constraints for the detection of the first VCL NAL unit of a primary coded picture are specified further below and can be used given the above claimed restriction to distinguish access units even if NAL units that are allowed to be removed are removed. The NAL units that can be removed are all types except VCL NAL unit of a primary coded picture.

The following constraints shall be obeyed by the order of the coded pictures and non-VCL NAL units within an access unit.

g) When an access unit delimiter NAL unit (NAL unit type 9) is present, it shall be the first NAL unit. There shall be at most one access unit delimiter NAL unit in any access unit.
h) When any SEI NAL units (NAL unit type 6) are present, they shall precede the primary coded picture.
i) When an SEI NAL unit containing a buffering period SEI message shall be the first SEI message payload of the first SEI NAL unit in the access unit, wherein a buffering period SEI NAL unit is for controlling the buffering management at decoder's side.
j) The primary coded picture (consisting of NAL units of NAL unit types 1-5 and having redundant picture count value being equal to zero) shall precede the corresponding redundant coded pictures.
k) When redundant coded pictures (consisting of NAL units of NAL unit types 1-5 and having redundant picture count value being not equal to zero) are present, they shall be ordered in ascending order of the value of redundant picture count value redundant_pic_cnt.
l) When an end of sequence NAL unit (NAL unit type 10) is present, it shall follow the primary coded picture and all redundant coded pictures (if any).
m) When an end of stream NAL (NAL unit type 11) unit is present, it shall be the last NAL unit.
n) NAL units having nal_unit_type equal to 0, 12, or in the range of 19 to 31, inclusive, shall not precede the first VCL NAL unit of the primary coded picture.
o) Sequence parameter set NAL units or picture parameter set NAL units may be present in an access unit, but cannot follow the last VCL NAL unit of the primary coded picture within the access unit, as this condition would specify the start of a new access unit (see constraint b)).
p) When a NAL unit having nal_unit_type equal to 7 or 8 is present in an access unit, it may not be referred to in the coded pictures of the access unit in which it is present, and may be referred to in coded pictures of subsequent access units.

In the following, the order of VCL NAL units and the association to coded pictures is described in more detail below.

q) Each VCL NAL unit is part of a coded picture.
r) The order of the VCL NAL units within a coded IDR picture is constrained as follows.
  If arbitrary slice order is allowed as specified by a certain syntax element, coded slice of an IDR picture NAL units may have any order relative to each other.
  Otherwise (arbitrary slice order is not allowed), the order of coded slice of an IDR picture NAL units shall be in the order of increasing macroblock address for the first macroblock of each coded slice of an IDR picture NAL unit.
s) The order of the VCL NAL units within a coded non-IDR picture is constrained as follows.
  If arbitrary slice order is allowed as specified by a specific syntax element, coded slice of a non-IDR picture NAL units or coded slice data partition A NAL units may have any order relative to each other. A coded slice data partition A NAL unit with a particular value of slice_id shall precede any present coded slice data partition B NAL unit with the same value of slice_id. A coded slice data partition A NAL unit with a particular value of slice_id shall precede any present coded slice data partition C NAL unit with the same value of slice_id. When a coded slice data partition B NAL unit with particular value of slice_id is present, it shall precede any present coded slice data partition C NAL unit with the same value of slice_id.
  Otherwise (arbitrary slice order is not allowed), the order of coded slice of a non-IDR picture NAL units or coded slice data partition A NAL units shall be in the order of increasing macroblock address for the first macroblock of each coded slice of a non-IDR picture NAL unit or coded slice data partition A NAL unit. A coded slice data partition A NAL unit with a particular value of slice_id shall immediately precede any present coded slice data partition B NAL unit with the same value of slice_id. A coded slice data partition A NAL unit with a particular value of slice_id shall immediately precede any present coded slice data partition C NAL unit with the same value of slice_id, when a coded slice data partition B NAL unit with the same value of slice_id is present; it shall immediately precede any present coded slice data partition C NAL unit with the same value of slice_id
t) NAL units having nal_unit_type equal to 12 may be present in the access unit but shall not precede the first VCL NAL unit of the primary coded picture within the access unit.
u) NAL units having nal_unit_type equal to 0 or in the range of 24 to 31, inclusive, which are unspecified, may be present in the access unit but shall not precede the first VCL NAL unit of the primary coded picture within the access unit.
v) NAL units having nal_unit_type in the range of 19 to 3, inclusive, which are reserved, shall not precede the first VCL NAL unit of the primary coded picture within the access unit.

The creation of the data stream 70 is further restricted by the following constraints in order to enable the detection of the first VCL NAL unit of a primary coded picture:

w) Any coded slice NAL unit or coded slice data partition A NAL unit of the primary coded picture of the current access unit shall be different from any coded slice NAL unit or coded slice data partition A NAL unit of the primary coded picture of the previous access unit in one or more of the following ways.
  frame_num differs in value. frame_num is an identifier in each VCL NAL unit indicating the picture 12 of the video 10a it belongs to. A value of frame_num may be assigned to more than one picture or access unit, but the value of frame_num in the payload data of the VCL NAL unit of successive access units 74 may not be the same. In other words, frame_num is used as a unique identifier for each short-term reference frame. For example, when the current picture is an IDR picture, frame_num shall be equal to zero.
  field_pic_flag differs in value. field_pic_flag as contained in the payload data 80 of VCL NAL units specifies, if equal to one, that the slice is associated to a coded field, i.e. a field of an interlaced frame, and, if equal to zero specifies that the picture which the VCL NAL unit having that field_pic_flag is a coded frame, i.e. a coded interleaved or coded progressive frame.

bottom_field_flag is present in both and differs in value. bottom_field_flag as contained in the payload data 80 of a VCL NAL unit specifies, if equal to one, that the slice is associated to a coded bottom field, whereas bottom_field_flag equal to zero specifies that the picture is a coded top field. To be more specific, a coded video sequence consists of a sequence of coded pictures, wherein a coded picture may represent either an entire frame or a single field. Generally, a frame of video can be considered to contain two interleaved fields, a top and a bottom field. The top field contains even-numbered rows, whereas the bottom field contains the odd-numbered rows, for example. Frames in which the two fields of a frame are kept at a different time instance, are referred to as interlaced frames. Otherwise, a frame is referred to as a progressive frame.

nal_ref_idc differs in value with one of the nal_ref_idc values being equal to 0. nal_ref_idc is an identifier that may be contained in a payload data 80 of a NAL unit. nal_ref_idc not equal to zero specifies that the content of the NAL unit contains a sequence parameter set or a picture parameter set or a slice of a reference picture or a slice data partition of a reference picture. Therefore, nal_ref_idc equal to zero for a NAL unit containing a slice or slice data partition indicates that a slice or slice data partition is part of a non-reference picture. Any nal_ref_idc shall not be equal to zero for a sequence parameter set or a picture parameter set in a NAL unit. If nal_ref_idc is equal to zero for one slice or slice data partition in a NAL unit of a particular picture, it shall be equal to zero for all slice and slice data partition NAL units of the picture. nal_ref_idc is, therefore, not equal to zero for IDR NAL units, i.e. NAL units with a nal_unit_type equal to 5. A nal_ref_idc is equal to zero for all NAL units having an nal_unit_type equal to 6, 9, 10, 11 or 12. Picture_order_cnt_type is an syntax element contained in payload data 80 in order to specify the method to code the syntax element picture_order_count. The value of pic_order_cnt_type shall be in the range of 0 to 2, inclusive. pic_order_cnt_type shall not be equal to 2 in a sequence that contains two or more consecutive non-reference frames, complementary non-reference field pairs or non-paired non-reference fields in decoding order. pic_order_cnt_lsb specifies, when contained in a payload data 80 of a VCL NAL unit, the picture order count coded for the field of a coded frame or for a coded field. An IDR picture shall, for example, have pic_order_cnt_lsb equal to zero. Data_pic_order_cnt_bottoms is a syntax element that specifies, when contained in a payload data 80 of a VCL NAL unit, the picture order count difference from the expected picture order count for the top field in a coded frame of a coded field.

frame_num is the same for both and pic_order_cnt_type is equal to 1 for both and either delta_pic_order_cnt[0] differs in value, or delta_pic_order_cnt[1] differs in value. pic_order_cnt[0] specifies the picture order count difference from the expected picture order count for the top field in a coded frame or for a coded field. delta_pic_order_cnt[1] specifies the picture order count difference from the expected picture order count for the bottom field and the coded frame.

nal_unit_type is equal to 5 for both and idr_pic_id differs in value. idr_pic_id is a syntax element contained in payload data 80 of IDR picture in a VCL NAL unit and indicates an identifier for different IDR pictures of different coded video sequences 72.

After having described an embodiment for an encoder 18 and its constraints for creation of a data stream 70, in the following there is described a possible functionality of a gateway 32 suitable for parsing the data stream 70 of encoder of FIG. 3 to a receiver 28.

The gateway 32 receives the data stream 70 NAL unit-wise at step 120. At step 122, the gateway 32 investigates the type number, i.e. nal_unit_type, of the current NAL unit 76 just received in order to determine at step 124 as to whether this NAL unit is of a NAL unit type to be removed. For example, the NAL data stream 70 is of high performance and has several redundant coded pictures 106. In this case, it could be, that gateway 32 decides to lower the redundancy level of the data stream 70 and removes all NAL units 76 from data stream 70 having NAL unit types 1 to 5 and concurrently having a syntax element in the payload data called redundant_pic_cnt being different to 0, wherein redundant_pic_cnt, in accordance with the present embodiment, equal to 0 indicates slice and slice data partitions belonging to the primary coded picture of an access unit. The reduction in redundancy is advantageous if the transmission link 30 between gateway 32 and receiver 28 has a low bit error rate.

Alternatively, gateway 32 decides to transmit sequence and picture parameter set NAL units via an extra transmission link (not shown in FIG. 2) to receiver 28. In this case, gateway 32 removes all NAL units of NAL unit types 7 and 8. Of course, it is possible that gateway 32 removes any combination of NAL unit types being removable.

If the NAL unit 76 received at step 120 is to be removed, gateway 32 performs the removal of the current NAL unit from the data stream 70 and discards this NAL unit at step 126. Otherwise, gateway 32 determines at step 128 as to whether the NAL unit received at step 120 has to be transmitted to the receiver 28 safely or has to be left unchanged. For example, if the NAL unit just received is a parameter set NAL unit it has to be transferred to the receiver 28. In this case, there are two possibilities for gateway 32. In the first case, gateway 32 decides to transmit the parameter set NAL unit via an extra transmission link. In this case, gateway 32 removes, in step 130, the NAL unit from the data stream 70 and, then, transmits, in step 132, the NAL unit via the extra transmission link. In particular, gateway 32 can perform the transmission of step 132 several times. Gateway 32 just has to comply with the constraints on the order of sequence and picture parameter set RBSPs and their activation at decoder side as mentioned above (see I and II).

Alternatively, gateway 32 decides to transmit NAL units containing the parameter sets in-band. In this case, gateway 32 inserts, at step 134, the current NAL unit at another position of the data stream 70 to be more precise, at a preceding position of the NAL data stream 70. Of course, step 134 may be performed several times. Gateway 32 thus has to guarantee that the constraints on the order of sequence and picture parameters at RBSPs and their activation at receiver 28 are obeyed (see constraints o and p).

After any of steps 126, 128, 132 and 134, gateway 32 checks, at step 136, as to whether there are NAL units left in the data stream 70. If this is the case, the next NAL unit is received at step 120. Otherwise, the process of FIG. 6 and gateway 32 awaits the reception of the next NAL data stream 70.

Figure 7:
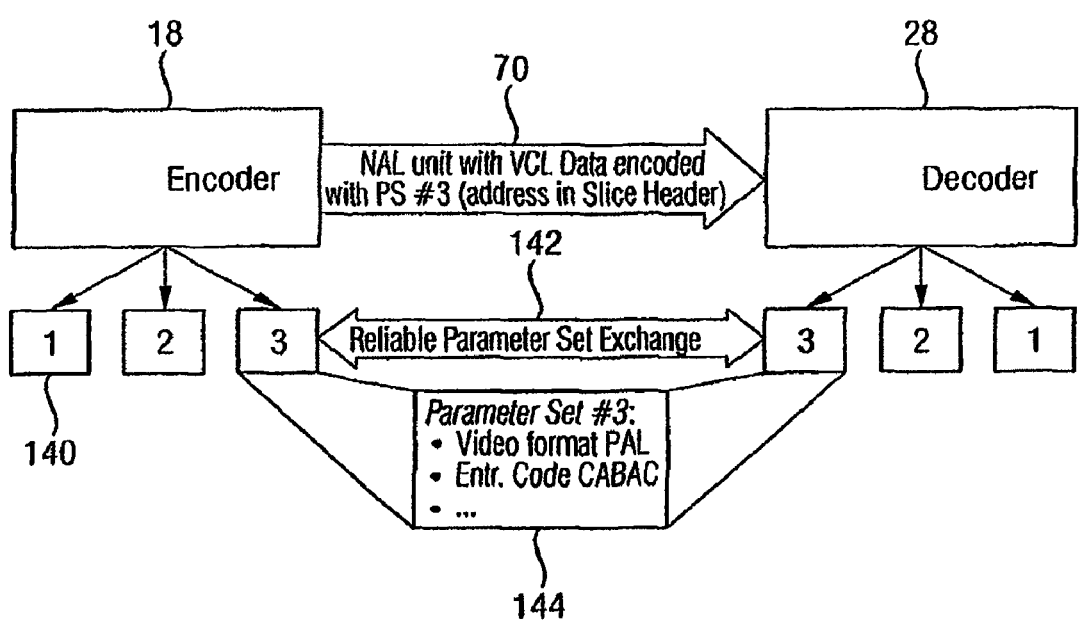
FIG. 7 shows a schematic diagram illustrating the parameter set transmission via an extra transmission link between encoder and decoder in accordance with an embodiment of the present invention.

In order to illustrate the decoupling of the transmission of infrequently changing information from the transmission of coded representations of the values of the samples in the video pictures the sequence and picture parameter set mechanism is illustrated in FIG. 7. FIG. 7 shows the encoder 18 and the receiving decoder 28. The data stream 70 is represented by an arrow. The data stream 70 passed from encoder 18 to decoder 28 comprises a NAL unit with VCL data that is encoded by means of a parameter set having a pic_parameter_set_id of 3 as an address or index in the slice header. As can be seen, the encoder 18 has generated several picture parameter sets, wherein in FIG. 7, the picture parameter set having pic_parameter_set_id 1, 2 and 3, respectively, are shown representatively by small boxes 140. The transmission of the parameter set NAL unit is performed via an extra transmission link 142 which is illustrated by an double-headed arrow indicated "reliable parameter set exchange". In particular, the content of the picture parameter set having pic_parameter_set_id of 3 is shown at 144 in more detail for illustration purposes. The picture parameter set having pic_parameter_set_id 3 contains information such as the video format used, i.e. PIL, and the entropy coding scheme used, such as one of a context adaptive binary arithmetic coding or a context adaptive variable length (Huffman) coding. So, the NAL unit with VCL data having pic_parameter_set_id as an index to the parameter set NAL unit 144 does not have to contain all the content of the parameter set NAL unit 144. Therefore, the amount of data contained in the stream 70 can be reduced. As mentioned above, the decoder 28 buffers the incoming parameter sets and indexes same by the pic_parameter_set_id in the current NAL units by use of the above explained activation mechanism (see I and II).

With respect to FIG. 8, in the following an embodiment for the functionality of receiver or decoder 28 is described. At step 160 decoder 28 receives a NAL unit 76 of a NAL unit data stream 70 which may have been modified by the gateway 32 by the process described with respect to FIG. 6 relative to the original version of the data stream as created by encoder 18. At step 162, the decoder 28 buffers the NAL unit 76 in a buffer having a predetermined buffer space exceeding a predetermined standardized minimum buffer size known to the encoder. Next, at step 164, the decoder 28 detects the beginning of a new access unit. In other words, the decoder 28 checks as to whether the NAL unit just received at step 160 is the first of a new access unit.

The detection in step 164 is performed by use of the aforementioned constraints on the order of NAL units and coded pictures and the association to access units (see a-f). In particular, the decoder 28 detects the beginning of a new access unit if the NAL unit received at step 160 is the first of any of the following NAL units after the last VCL NAL unit of a primary coded picture of the current access unit:

Access unit delimiter NAL unit (when present)
sequence parameter set NAL unit (when present)
picture parameter set NAL unit (when present)
SEI NAL unit (when present)
NAL units with nal_unit_type in the range of 13 to 18, inclusive
first VCL NAL unit of a primary coded picture (always present)

It is noted that the decoder 28 can detect the presence of a last VCL NAL unit of a primary coded picture 100 by means of the assumption that the payload data of all the VCL NAL units of the primary coded picture 100 have to yield a complete pre-coded version of one picture as well as by means of the constraints mentioned above at (w).

When a new access unit has been detected (step 166), the decoder 28 deallocates or flushes buffer space at step 168 by removing an odd access unit stored in the buffer. Thereupon, the decoder 28 makes available the picture derived from the current access unit, i.e. the access unit which precedes the new access unit, just detected in step 164.

Otherwise, i.e. if no new access unit has been detected (step 166), or after step 170, the decoder 28 decodes the NAL unit received at step 160 in order to receive the syntax elements contained therein.

The process then loops back to step 160. As may have become clear from the foregoing description, the decoder 28 is not liable to a buffer overflow as long as (1) the encoder 18 has created an NAL unit data stream 70 with access unit sizes that comply with the maximum buffer size and (2) gateway 32 lets the data stream 70 unchanged, merely removes and discards removable and negligible NAL units from the data stream 70, merely removes removable but essential NAL units from the data stream 70 with transmitting them via an extra transmission link or, alternatively, inserts NAL units merely in access units so that the resulting access unit size does not result in an buffer overflow at decoder's side. Anyway, by the above-described constraints on the creation of the data stream, the decoder 28 is in any way capable of detecting the beginning of a new access unit in an unitary and exact way. Therefore, it is possible for the encoder 18 and the gateway 32 to forecast the buffer space consumption at decoder side and, therefore, to avoid buffer spacer overflow, provided the decoder has the minimum amount of buffer space.

As may be clear from the above, the present invention is not restricted to multimedia, video or audio signals. Moreover, it is noted with respect to FIG. 2, that other constellations in which the present invention could be used are also possible. For example, more than one gateway 32 could be interposed between the data stream presentation (encoder) and the decoder. With respect to FIG. 6 it is noted, that the gateway 32 does not have to influence all of the options shown in FIG. 6. For example, a gateway could be designed to implement merely the removal of NAL units from the data stream without implementing steps 128 to 134. Alternatively, a gateway could implement all steps of FIG. 6 except step 134 or all steps except 130 and 132.

Figure 8:
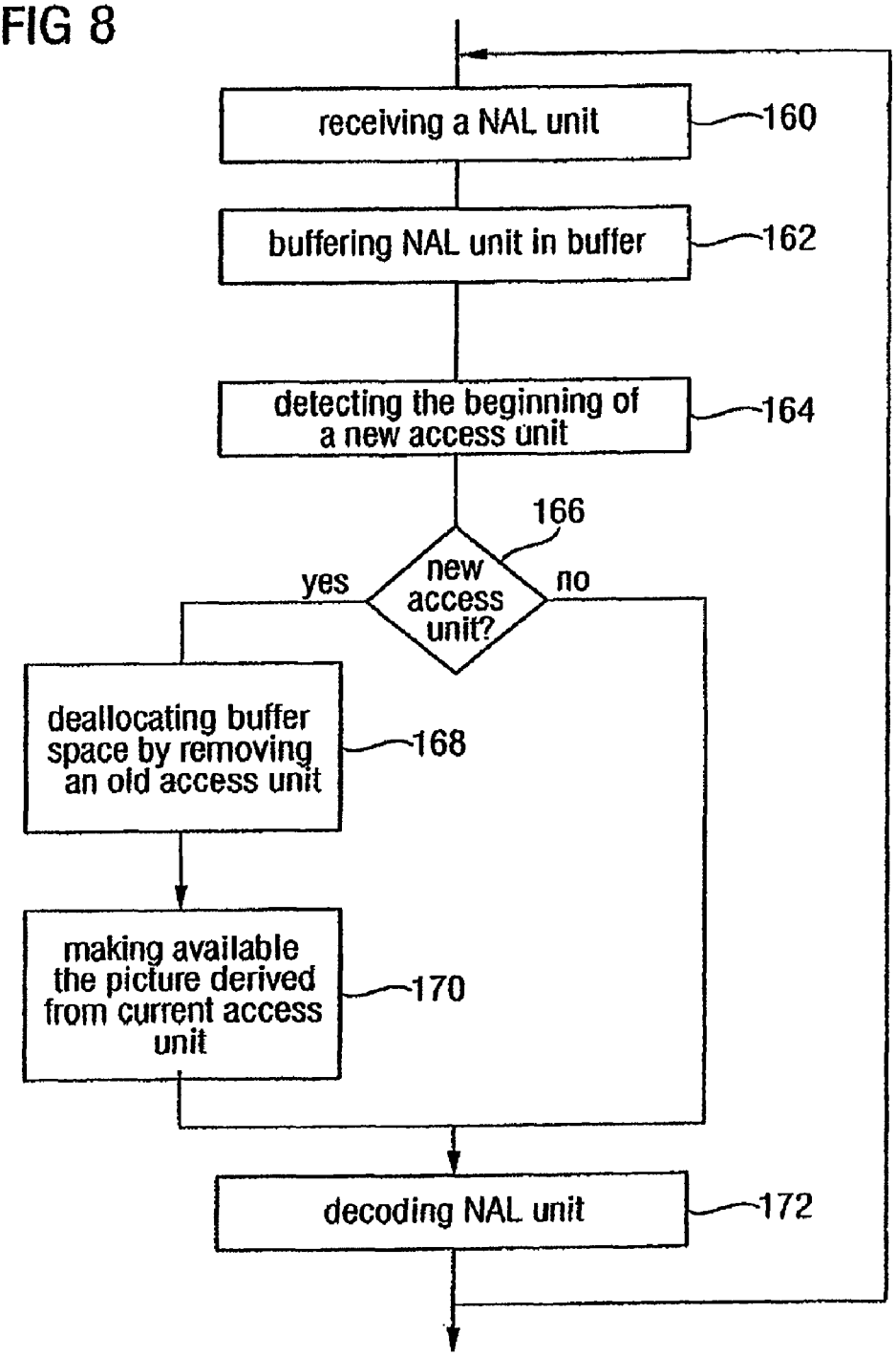
FIG. 8 shows a flow diagram illustrating the operation of the decoder of FIG. 2 in accordance with the specific embodiment of the present invention.

With regard to decoder of FIG. 8, it is noted that the buffering management described there helps in standardizing the data stream format of the data stream 70 of that embodiment. Nevertheless, the buffer management may be realized in a different way, for example with de-allocating buffer space in other units than access units.

In other words, in accordance with the above embodiments each syntax element is placed into a logical packet called a NAL unit. Rather than forcing a specific bitstream interface to the system as in prior video standards, the NAL unit syntax structure allows greater customization of the method of carrying the video content in a manner appropriate for each specific network. In particular, the above embodiment defines how NAL units are to be ordered within in access units. The constraints formulated on the order of NAL units specify the decoding order that must by accepted by an standard-conform decoder allowing a novel degree of freedom. Moreover, the ordering of the NAL units and their arrangement specifies access units and makes the distinction between various access units possible even if NAL units that are allowed to be removed from the bitstream are removed.

The above embodiments permit, by their new way of defining the decoding order, an increased degree of flexibility that is especially important in internet applications where each NAL unit is typically transported in one packet and shuffling is likely to occur. This permits simpler decoder implementations.

The distinction between various access units even if units that are allowed to be removed from the bitstream are removed permits a flexible rate shaping and transcoding of data and makes the method robust the transmission errors. The automatic distinction method also increases coding efficiency by making start codes or delimiter codes superfluous.

Depending on an actual implementation, the inventive encoding/decoding/converting methods can be implemented in hardware or in software. Therefore, the present invention also relates to a computer program, which can be stored on a computer-readable medium such as a CD, a disk or any other data carrier. The present invention is, therefore, also a computer program having a program code which, when executed on a computer, performs the inventive method of encoding, converting or decoding described in connection with the above figures.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Furthermore, it is noted that all steps indicated in the flow diagrams are implemented by respective means in the encoder, gateway or decoder, respectively, an that the implementations may comprise subroutines running on a CPU, circuit parts of an ASIC or the like.

What is claimed is:

1. An apparatus for coding a video, the apparatus configured to
process the video in order to obtain NAL units, each NAL unit being of a NAL unit type of a predetermined set of NAL unit types, the set of NAL unit types, at least, comprising
a picture parameter set NAL unit type with the NAL units of this type comprising a respective picture parameter set and a corresponding picture parameter set ID so as to be referable for one or more individual pictures of the video,
a sequence parameter set NAL unit type with the NAL units of this type comprising a respective sequence parameter set, and a sequence parameter set ID so as to be referable by one or more NAL units of the picture parameter set NAL unit type, with each NAL unit of the picture parameter set NAL unit type comprising an identifier referring to a predetermined sequence parameter set ID with the sequence parameter set of the corresponding sequence parameter set ID not being repeated in the respective picture parameter set NAL unit; and
a coded picture NAL unit type with the NAL units of this type comprising syntax elements of slice header data and/or syntax elements concerning slice transform coefficients of one or more slices of an individual picture of the video, and an identifier referring to a predetermined picture parameter set ID with the picture parameter set of the corresponding picture parameter set ID not being repeated in the respective coded picture NAL unit; and
convey the NAL units to a decoder so that at least the NAL units of the coded picture NAL unit type are arranged in a data stream comprising consecutive access units of consecutive NAL units, so that
each access unit comprises NAL units of the coded picture NAL unit type which together compose an individual picture of the video with NAL units of the coded picture NAL unit type comprising syntax elements of slice header data and/or syntax elements concerning slice transform coefficients of the respective individual picture being absent in other access units;
when a picture parameter set ID is referred to by a NAL unit of the coded picture NAL unit type in the data stream, the picture parameter set corresponding to that picture parameter set ID is activated and remains activated until deactivated by an activation of another picture parameter set ID following in the data stream,
for each picture parameter set ID, at least one NAL unit comprising the picture parameter set corresponding to a respective picture parameter set ID is available to the decoder prior to the activation of the respective picture parameter set ID by a respective NAL unit of the coded picture NAL unit type,
for each picture parameter set ID being activated, the picture parameter sets of the NAL units of the picture parameter set NAL unit type comprising the respective activated picture parameter set ID are equal to each other unless a NAL unit of the picture parameter set NAL unit type comprising the respective activated picture parameter set ID follows a last NAL unit of a coded picture NAL unit type belonging to any individual picture and precedes a first NAL unit of the coded picture NAL unit type of another individual picture;
when a sequence parameter set ID is referred to by a NAL unit of the picture parameter set NAL unit type, the sequence parameter set corresponding to that sequence parameter set ID is activated and remains activated until deactivated by an activation of another sequence parameter set ID,
for each sequence parameter set ID, at least one NAL unit comprising the sequence parameter set corresponding to a respective sequence parameter set ID is available to the decoder prior to the activation of the respective sequence parameter set ID by a respective NAL unit of the picture parameter set NAL unit type,
for each sequence parameter set ID being activated, the sequence parameter sets of the NAL units of the sequence parameter set NAL unit type comprising the respective activated sequence parameter set ID are equal to each other unless a NAL unit of the sequence parameter set NAL unit type comprising the respective activated sequence parameter set ID follows a last access unit of a access unit sequence of the video and precedes a first NAL unit of the coded picture NAL unit type of another access unit sequence of the video.

2. A decoding apparatus, the decoding apparatus configured to
receive NAL units, each NAL unit being of a NAL unit type of a predetermined set of NAL unit types, the set of NAL unit types, at least, comprising
a picture parameter set NAL unit type with the NAL units of this type comprising a respective picture parameter set and a corresponding picture parameter set ID so as to be referable for one or more individual pictures of a video,
a sequence parameter set NAL unit type with the NAL units of this type comprising a respective sequence parameter set, and a sequence parameter set ID so as to be referable by one or more NAL units of the picture parameter set NAL unit type, with each NAL unit of the picture parameter set NAL unit type comprising an identifier referring to a predetermined sequence parameter set ID with the sequence parameter set of the corresponding sequence parameter set ID not being repeated in the respective picture parameter set NAL unit; and a coded picture NAL unit type with the NAL units of this type comprising syntax elements of slice header data and/or syntax elements concerning slice transform coefficients of one or more slices of an individual picture of the video, and an identifier referring to a predetermined picture parameter set ID with the picture parameter set of the corresponding picture parameter set ID not being repeated in the respective coded picture NAL unit, wherein at least the NAL units of the coded picture NAL unit type are arranged in a data stream comprising consecutive access units of consecutive NAL units;

reconstruct the video by using, for each access unit, the NAL units of the coded picture NAL unit type within the respective access unit to compose an individual picture of the video, with NAL units of the coded picture NAL unit type comprising syntax elements of slice header data and/or syntax elements concerning slice transform coefficients of the respective individual picture being absent in other access units;

when a picture parameter set ID is referred to by a NAL unit of the coded picture NAL unit type in the data stream, using the picture parameter set corresponding to that picture parameter set ID for the NAL unit of the coded picture NAL unit type and, if not already activated, activating the picture parameter set corresponding to that picture parameter set ID with the respective picture parameter set remaining activated until deactivated by an activation of another picture parameter set ID following in the data stream, wherein, for each picture parameter set ID, at least one NAL unit comprising the picture parameter set corresponding to a respective picture parameter set ID is available to the decoder prior to the activation of the respective picture parameter set ID by a respective NAL unit of the coded picture NAL unit type, and, for each picture parameter set ID being activated, the picture parameter sets of the NAL units of the picture parameter set NAL unit type comprising the respective activated picture parameter set ID are equal to each other unless a NAL unit of the picture parameter set NAL unit type comprising the respective activated picture parameter set ID follows a last NAL unit of a coded picture NAL unit type belonging to any individual picture and precedes a first NAL unit of the coded picture NAL unit type of another individual picture;

when a sequence parameter set ID is referred to by a NAL unit of the picture parameter set NAL unit type, using the sequence parameter set corresponding to that sequence parameter set ID for the NAL unit of the picture parameter set NAL unit type and, if not already activated, activating the sequence parameter set corresponding to that sequence parameter set ID with the respective sequence parameter set remaining activated until deactivated by an activation of another sequence parameter set ID, wherein, for each sequence parameter set ID, at least one NAL unit comprising the sequence parameter set corresponding to a respective sequence parameter set ID is available to the decoder prior to the activation of the respective sequence parameter set ID by a respective NAL unit of the picture parameter set NAL unit type, and, for each sequence parameter set ID being activated, the sequence parameter sets of the NAL units of the sequence parameter set NAL unit type comprising the respective activated sequence parameter set ID are equal to each other unless a NAL unit of the sequence parameter set NAL unit type comprising the respective activated sequence parameter set ID follows a last access unit of a access unit sequence of the video and precedes a first NAL unit of the coded picture NAL unit type of another access unit sequence of the video.

* * * * *